(12) United States Patent
Kametani et al.

(10) Patent No.: US 8,764,882 B2
(45) Date of Patent: Jul. 1, 2014

(54) FLUID TREATMENT METHOD, FLUID TREATMENT APPARATUS, AND FLUID

(75) Inventors: Keiichirou Kametani, Settsu (JP); Morimasa Watanabe, Settsu (JP); Osamu Tanaka, Settsu (JP)

(73) Assignee: Daikin Industries, Ltd., Osaka (JP)

(*) Notice: Subject to any disclaimer, the term of this patent is extended or adjusted under 35 U.S.C. 154(b) by 221 days.

(21) Appl. No.: 13/320,817

(22) PCT Filed: May 11, 2010

(86) PCT No.: PCT/JP2010/003189
§ 371 (c)(1),
(2), (4) Date: Nov. 16, 2011

(87) PCT Pub. No.: WO2010/134284
PCT Pub. Date: Nov. 25, 2010

(65) Prior Publication Data
US 2012/0068119 A1    Mar. 22, 2012

(30) Foreign Application Priority Data
May 22, 2009 (JP) ................................. 2009-124402

(51) Int. Cl.
*B01D 53/06* (2006.01)

(52) U.S. Cl.
USPC .................. 95/113; 95/139; 96/125; 96/132; 96/144

(58) Field of Classification Search
USPC .............. 96/125, 132, 144, 146, 150; 95/113, 95/117, 121, 139, 148
See application file for complete search history.

(56) References Cited

U.S. PATENT DOCUMENTS 5,158,582 A * 10/1992 Onitsuka et al. ................. 95/129
5,167,679 A * 12/1992 Maekawa et al. ............... 96/125

(Continued)

FOREIGN PATENT DOCUMENTS

| JP | 6-99013 A | 4/1994 |
|---|---|---|
| JP | 2001-149732 A | 6/2001 |

(Continued)

OTHER PUBLICATIONS

European Search Report of corresponding EP Application No. 10 77 7524.9 dated Nov. 26, 2012.

(Continued)

*Primary Examiner* — Frank Lawrence, Jr.
(74) *Attorney, Agent, or Firm* — Global IP Counselors

(57) ABSTRACT

A fluid treatment method reduces a concentration of a first component included in a fluid-to-be-treated. A fluid treatment apparatus reduces a concentration of a first component included in a fluid-to-be-treated. A concentration of a second component differing from the first component is reduced in the fluid-to-be-treated in order to obtain a first fluid. The first fluid passes through at least part of an adsorption unit in order to obtain a second fluid. The adsorption unit is capable of adsorbing both the first component and the second component and has at least an ability to adsorb the first component that is temperature dependent. A third fluid pass through a portion of the adsorption unit through which the first fluid has passed. The third fluid has a concentration of the second component that is lower than in the fluid-to-be-treated and a temperature that is higher than the fluid-to-be-treated.

17 Claims, 16 Drawing Sheets

(56) References Cited

U.S. PATENT DOCUMENTS

| | | | |
|---|---|---|---|
| 5,242,473 A * | 9/1993 | Ogasahara | 96/125 |
| 5,695,546 A * | 12/1997 | Izumi et al. | 95/115 |
| 6,176,897 B1 | 1/2001 | Keefer | |
| 6,471,749 B1 | 10/2002 | Kawai et al. | |
| 7,166,149 B2 * | 1/2007 | Dunne et al. | 95/113 |
| 7,217,313 B2 * | 5/2007 | Motono et al. | 95/113 |
| 2001/0009124 A1 * | 7/2001 | Suzuki et al. | 95/113 |

FOREIGN PATENT DOCUMENTS

| | | |
|---|---|---|
| JP | 2001-507982 A | 6/2001 |
| JP | 2001-205045 A | 7/2001 |
| JP | 2002-85935 A | 3/2002 |
| JP | 2002-186821 A | 7/2002 |
| JP | 2002-253656 A | 9/2002 |
| JP | 2004-105786 A | 4/2004 |
| JP | 2004-202393 A | 7/2004 |
| JP | 2005-161128 A | 6/2005 |
| JP | 2008-302277 A | 12/2008 |

OTHER PUBLICATIONS

International Search Report of corresponding PCT Application No. PCT/JP2010/003189.
International Preliminary Report of corresponding PCT Application No. PCT/JP2010/003189.

* cited by examiner

FLUID TREATMENT METHOD, FLUID TREATMENT APPARATUS, AND FLUID

CROSS-REFERENCE TO RELATED APPLICATIONS

This U.S. National stage application claims priority under 35 U.S.C. §119(a) to Japanese Patent Application No. 2009-124402, filed in Japan on May 22, 2009, the entire contents of which are hereby incorporated herein by reference.

TECHNICAL FIELD

The present invention relates to a fluid treatment method, a fluid treatment apparatus, and a fluid.

BACKGROUND ART

For example, as described in Japanese Patent Publication No. 2001-205045, a method of recovering carbon dioxide from exhaust gas with a high recovery efficiency has been proposed. In this method, carbon dioxide is recovered by leading exhaust gas that has been dried beforehand to an adsorbent that adsorbs carbon dioxide. Then, by supplying air that has been heated to this adsorbent, carbon dioxide is desorbed from the adsorbent and the adsorption capacity of the adsorbent is regenerated.

SUMMARY

Technical Problem

However, in the carbon dioxide recovery method described in Japanese Patent Publication No. 2001-205045, the air that has been heated and has passed through in order to regenerate the adsorbent is again heated and is reused in order to regenerate the adsorbent.

However, the heated air for regenerating the adsorbent includes desorbed carbon dioxide, so the concentration of carbon dioxide increases every time reuse is repeated. In this way, in a regeneration treatment that uses air whose carbon dioxide concentration has increased, the efficiency of regenerating the adsorbent cannot be elevated.

The present invention has been made in light of the problem described above, and it is an object of the present invention to provide a fluid treatment method, a fluid treatment apparatus, and a fluid that are capable of improving the effect of regenerating an adsorption function.

Solution to Problem

A fluid treatment method of a first aspect is a fluid treatment method that reduces the concentration of a first component included in a fluid-to-be-treated, and the method comprises a first step, a second step, and a regeneration step. In the first step, the concentration of a second component differing from the first component and included in the fluid-to-be-treated is reduced to thereby obtain a first fluid. In the second step, the first fluid is caused to pass through at least part of an adsorption unit to thereby obtain a second fluid. This adsorption unit is capable of adsorbing both the first component and the second component, and at least its ability to adsorb the first component is temperature dependent. In the regeneration step, a third fluid in which the concentration of the second component is lower than in the fluid-to-be-treated and whose temperature is higher than that of the fluid-to-be-treated is caused to pass through the portion of the adsorption unit through which the first fluid has been caused to pass. Examples of the fluid that is treated here include gases.

Usually, even if an adsorbent capable of adsorbing both a first component and a second component is used to try to reduce the concentration of the first component in a fluid-to-be-treated, in a case where the concentration of the second component in the fluid-to-be-treated has not been reduced, sometimes the ability of the adsorbent to adsorb the first component ends up being lowered.

With respect thereto, in this fluid treatment method, the first fluid in which the concentration of the second component has been reduced is caused to pass through the adsorption unit, so the first component can be more efficiently adsorbed in the adsorption unit. For this reason, the concentration of the first component in the fluid-to-be-treated can be more efficiently reduced. Additionally, the adsorption unit is regenerated by the third fluid in which the concentration of the second component has been reduced and which is heated, so the adsorption quantity of the second component and the adsorption quantity of the first component in the adsorption unit after the regeneration step can be kept low.

Further, the third fluid is heated beforehand before it reaches the adsorption unit. For this reason, the regeneration efficiency can be improved even in the neighborhood of the inlet in the adsorption unit into which the third fluid flows.

Because of this, the ability to adsorb the first component in a case where the first fluid has been caused to pass through the regenerated adsorption unit can be further improved.

A fluid treatment method of a second aspect is the fluid treatment method of the first aspect, wherein the concentration of the first component in the third fluid is also reduced.

In this fluid treatment method, the concentration of not only the second component but also the first component in the third fluid is reduced. For this reason, in a case where the third fluid is caused to pass through the portion of the adsorption unit through which the first fluid has passed to thereby regenerate that portion, the adsorption quantity of the first component after regeneration can be kept lower.

A fluid treatment method of a third aspect is the fluid treatment method of the first or second aspect and further comprises a cooling step of causing a fluid-for-cooling to pass through the portion of the adsorption unit through which the third fluid has passed in the regeneration step. This fluid-for-cooling is a fluid that is part of the first fluid or the second fluid and whose temperature is lower than that of the third fluid.

In this fluid treatment method, in a case where the ability to adsorb the first component is higher the lower the temperature of the adsorption unit is, it becomes possible to further improve the ability to adsorb the first component by performing the cooling step after the third fluid that is heated has been caused to pass through. Additionally, the concentration of the second component included in the fluid that is caused to pass through the adsorption unit when performing this cooling step is reduced, so the second component can be suppressed from being adsorbed in the adsorption unit at the time of the cooling step.

A fluid treatment method of a fourth aspect is the fluid treatment method of the third aspect, wherein the third fluid is a fluid obtained by heating the fluid-for-cooling that has passed through the adsorption unit in the cooling step.

In this fluid treatment method, the temperature of the fluid-for-cooling that has passed through the adsorption unit rises because the fluid-for-cooling absorbs the heat of the adsorption unit that had been warmed in the regeneration step. This fluid-for-cooling that has passed through the adsorption unit is a fluid in which the second component has already been reduced, and its temperature has risen, so it can be used as the third fluid by further heating it. For this reason, heat corresponding to the quantity of heat that the fluid-for-cooling has absorbed when passing through the adsorption unit is recovered, whereby the quantity of heat that becomes necessary for heating for obtaining the third fluid can be kept small.

A fluid treatment method of a fifth aspect is the fluid treatment method of any of the first to fourth aspects, wherein the regeneration step is performed by moving a position through which the first fluid is caused to pass and a position through which the third fluid is caused to pass in the adsorption unit.

In this fluid treatment method, the regeneration step is performed by moving, inside the adsorption unit, the position through which the first fluid is caused to pass and the position through which the third fluid is caused to pass, so the second step and the regeneration step can be continuously performed. Because of this, it becomes possible to continuously perform the treatment for adsorbing the first component using the regenerated adsorption unit.

A fluid treatment method of a sixth aspect is the fluid treatment method of any of the first to fifth aspects, wherein the first component is carbon dioxide. The second component is water.

In this fluid treatment method, it becomes possible to effectively reduce the carbon dioxide concentration even in a case where an adsorption unit having the ability to adsorb both carbon dioxide and water is used in order to reduce the concentration of carbon dioxide in the fluid-to-be-treated.

A fluid treatment apparatus of a seventh aspect is a fluid treatment apparatus that reduces the concentration of a first component included in a fluid-to-be-treated, the apparatus comprises a second component treatment unit, an adsorption unit, a first feed unit, a heating unit, and a second feed unit. The second component treatment unit reduces the concentration of a second component differing from the first component and included in the fluid-to-be-treated. The adsorption unit is capable of adsorbing both the first component and the second component, and at least its ability to adsorb the first component is temperature dependent. The first feed unit causes a first fluid that is part of the fluid-to-be-treated that has passed through the second component treatment unit to pass through at least part of the adsorption unit. The heating unit heats a fourth fluid that is at least part of the portion, excluding the first fluid, of the fluid-to-be-treated that has passed through the second component treatment unit until the temperature of the fourth fluid becomes higher than that of the fluid-to-be-treated to thereby obtain a fifth fluid. The second feed unit causes the fifth fluid to pass through the portion of the adsorption unit through which the fluid-to-be-treated has passed via the second component treatment unit. Examples of the fluid that is treated here include gases. Further, examples of the second component treatment unit also include a unit that can not only reduce the concentration of the second component but can also reduce the concentration of the first component. Other treatments may also be added, in a scope that does not run counter to the object of the present invention, with respect to the first fluid before it is caused to pass through the adsorption unit. Further, in obtaining the fifth fluid, other treatments may also be added, in a scope that does not run counter to the object of the present invention, before heating or after heating the fourth fluid.

Usually, even if an adsorbent capable of adsorbing both a first component and a second component is used to try to reduce the concentration of the first component in a fluid-to-be-treated, in a case where the concentration of the second component in the fluid-to-be-treated has not been reduced, sometimes the ability of the adsorbent to adsorb the first component ends up being lowered.

With respect thereto, in this fluid treatment apparatus, the fluid-to-be-treated is caused to pass through the adsorption unit after the concentration of the second component in the fluid-to-be-treated has been reduced, so the first component can be more efficiently adsorbed in the adsorption unit. For this reason, the concentration of the first component in the fluid-to-be-treated can be more efficiently reduced. Additionally, the adsorption unit is regenerated by the fifth fluid in which the concentration of the second component has been reduced and which is heated, so the adsorption quantity of the second component and the adsorption quantity of the first component in the portion of the adsorption unit through which the fifth fluid has passed can be kept low.

Further, the fifth fluid is heated beforehand before it reaches the adsorption unit. For this reason, the regeneration efficiency can be improved even in the neighborhood of the inlet in the adsorption unit into which the fifth fluid flows.

Because of this, the ability to adsorb the first component in a case where the first fluid has been caused to pass through the regenerated adsorption unit can be further improved.

A fluid treatment apparatus of an eighth aspect is the fluid treatment apparatus of the seventh aspect and further comprises a third feed unit. The third feed unit causes a first fluid-for-cooling to pass through the portion of the adsorption unit through which the fifth fluid has passed. This first fluid-for-cooling is part of the fluid-to-be-treated that has been treated in the second component treatment unit or is part of the fluid-to-be-treated that has passed through at least part of the adsorption unit after having been treated in the second component treatment unit, and its temperature is lower than that of the fifth fluid.

In this fluid treatment apparatus, in a case where the ability to adsorb the first component is higher the lower the temperature of the adsorption unit is, it becomes possible to further improve the ability to adsorb the first component by cooling the adsorption unit after the fifth fluid that is heated has been caused to pass through. Additionally, the concentration of the second component included in the fluid that is caused to pass through the adsorption unit when performing this cooling of the adsorption unit is reduced, so the second component can be suppressed from being adsorbed in the adsorption unit at the time of the cooling of the adsorption unit.

A fluid treatment apparatus of a ninth aspect is the fluid treatment apparatus of the eighth aspect, wherein the fifth fluid is a fluid obtained by heating the first fluid-for-cooling that has passed through the adsorption unit.

In this fluid treatment apparatus, the temperature of the first fluid-for-cooling that has passed through the adsorption unit rises because the first fluid-for-cooling absorbs the heat of the adsorption unit that had been warmed by the passage of the fifth fluid. This first fluid-for-cooling that has passed through the adsorption unit is a fluid in which the second component has already been reduced, and its temperature has risen, so it can be used as the fifth fluid by further heating it. For this reason, heat corresponding to the quantity of heat that the first fluid-for-cooling has absorbed when passing through the adsorption unit is recovered, whereby the quantity of heat that becomes necessary for heating for obtaining the fifth fluid can be kept small.

A fluid treatment apparatus of a tenth aspect is a fluid treatment apparatus that reduces the concentration of a first component included in a fluid-to-be-treated, and the fluid treatment apparatus comprises a second component first treatment unit, an adsorption unit, a fourth feed unit, a second component second treatment unit, a heating unit, and a fifth feed unit. The second component first treatment unit reduces the concentration of a second component differing from the first component and included in the fluid-to-be-treated. The adsorption unit is capable of adsorbing both the first component and the second component, and at least its ability to adsorb the first component is temperature dependent. The fourth feed unit causes a first fluid that is the fluid-to-be-treated that has passed through the second component first treatment unit to pass through at least part of the adsorption unit. The second component second treatment unit reduces the concentration of the second component. The heating unit heats a sixth fluid that at least is obtained by a treatment using the second component second treatment unit and in which the concentration of the second component is lower than in the fluid-to-be-treated until the temperature of the sixth fluid becomes higher than that of the fluid-to-be-treated to thereby obtain a fifth fluid. The fifth feed unit causes the fifth fluid to pass through the portion of the adsorption unit through which the fluid-to-be-treated has passed via the second component first treatment unit. Examples of the fluid that is treated here include gases. Further, examples of the second component first treatment unit also include a unit that can not only reduce the concentration of the second component but can also reduce the concentration of the first component. Other treatments may also be added, in a scope that does not run counter to the object of the present invention, with respect to the first fluid before it is caused to pass through the adsorption unit. Further, in obtaining the fifth fluid, other treatments may also be added, in a scope that does not run counter to the object of the present invention, before heating or after heating the sixth fluid.

Usually, even if an adsorbent capable of adsorbing both a first component and a second component is used to try to reduce the concentration of the first component in a fluid-to-be-treated, in a case where the concentration of the second component in the fluid-to-be-treated has not been reduced, sometimes the ability of the adsorbent to adsorb the first component ends up being lowered.

With respect thereto, in this fluid treatment apparatus, the fluid-to-be-treated is caused to pass through the adsorption unit after the concentration of the second component in the fluid-to-be-treated has been reduced, so the first component can be more efficiently adsorbed in the adsorption unit. For this reason, the concentration of the first component in the fluid-to-be-treated can be more efficiently reduced. Additionally, the adsorption unit is regenerated by the fifth fluid in which the concentration of the second component has been reduced and which is heated, so the adsorption quantity of the second component and the adsorption quantity of the first component in the portion of the adsorption unit through which the fifth fluid has passed can be kept low.

Further, the fifth fluid is heated beforehand before it reaches the adsorption unit. For this reason, the regeneration efficiency can be improved even in the neighborhood of the inlet in the adsorption unit into which the fifth fluid flows.

Because of this, the ability to adsorb the first component in a case where the first fluid has been caused to pass through the regenerated adsorption unit can be further improved.

A fluid treatment apparatus of an eleventh aspect is the fluid treatment apparatus of the tenth aspect and further comprises a sixth feed unit. The sixth feed unit causes a second fluid-for-cooling to pass through the portion of the adsorption unit through which the fifth fluid has passed. This second fluid-for-cooling is part of the fluid-to-be-treated that has been treated in the second component first treatment unit or is part of the fluid-to-be-treated that has passed through at least part of the adsorption unit after having been treated in the second component first treatment unit, and its temperature is lower than that of the fifth fluid.

In this fluid treatment apparatus, in a case where the ability to adsorb the first component is higher the lower the temperature of the adsorption unit is, it becomes possible to further improve the ability to adsorb the first component by cooling the adsorption unit after the fifth fluid that is heated has been caused to pass through. Additionally, the concentration of the second component included in the fluid that is caused to pass through the adsorption unit when performing this cooling of the adsorption unit is reduced, so the second component can be suppressed from being adsorbed in the adsorption unit at the time of the cooling of the adsorption unit.

A fluid treatment apparatus of a twelfth aspect is the fluid treatment apparatus of the eleventh aspect, wherein the fifth fluid is a fluid obtained by heating the second fluid-for-cooling that has passed through the adsorption unit.

In this fluid treatment apparatus, the temperature of the second fluid-for-cooling that has passed through the adsorption unit rises because the second fluid-for-cooling absorbs the heat of the adsorption unit that had been warmed by the passage of the fifth fluid. This second fluid-for-cooling that has passed through the adsorption unit is a fluid in which the second component has already been reduced, and its temperature has risen, so it can be used as the fifth fluid by further heating it. For this reason, heat corresponding to the quantity of heat that the second fluid-for-cooling has absorbed when passing through the adsorption unit is recovered, whereby the quantity of heat that becomes necessary for heating for obtaining the fifth fluid can be kept small.

A fluid treatment apparatus of a thirteenth aspect is the fluid treatment apparatus of any of the seventh to twelfth aspects, wherein the concentration of the first component in the fifth fluid is reduced by the adsorption unit.

In this fluid treatment apparatus, the concentration of not only the second component but also the first component in the fifth fluid is reduced. For this reason, in a case where the fifth fluid is caused to pass through the portion of the adsorption unit through which the first fluid has passed to thereby regenerate that portion, the adsorption quantity of the first component after regeneration can be kept lower.

A fluid treatment apparatus of a fourteenth aspect is the fluid treatment apparatus of any of the seventh to tenth aspects and further comprises a drive unit. The drive unit moves a position through which the first fluid is caused to pass and a position through which the fifth fluid is caused to pass in the adsorption unit.

In this fluid treatment apparatus, because of the driving by the drive unit, the position through which the first fluid is caused to pass and the position through which the fifth fluid is caused to pass can be moved inside the adsorption unit. For this reason, the treatment for adsorbing the first component and the treatment for regenerating the adsorption unit can be continuously and automatically performed. Because of this, it becomes possible to continuously and automatically perform the treatment for adsorbing the first component using the regenerated adsorption unit.

A fluid treatment apparatus of a fifteenth aspect is the fluid treatment apparatus of any of the seventh to eleventh aspects, wherein the first component is carbon dioxide. The second component is water.

In this fluid treatment apparatus, it becomes possible to effectively reduce the carbon dioxide concentration even in a case where an adsorption unit having the ability to adsorb both carbon dioxide and water is used in order to reduce the concentration of carbon dioxide in the fluid-to-be-treated.

A fluid of a sixteenth aspect is a fluid in which the concentration of a first component included in a fluid-to-be-treated has been reduced and which is obtained by the fluid treatment method of any one of the first to sixth aspects.

A fluid of a seventeenth aspect is a fluid in which the concentration of a first component included in a fluid-to-be-treated has been reduced and which is obtained by the fluid treatment apparatus of any one of the seventh to fifteenth aspects.

Advantageous Effects of Invention

In the fluid treatment method of the first aspect, the ability to adsorb the first component in a case where the first fluid has been caused to pass through the regenerated adsorption unit can be further improved.

In the fluid treatment method of the second aspect, in a case where the third fluid is caused to pass through the portion of the adsorption unit through which the first fluid has passed to thereby regenerate that portion, the adsorption quantity of the first component after regeneration can be kept lower.

In the fluid treatment method of the third aspect, the second component can be suppressed from being adsorbed in the adsorption unit at the time of the cooling step.

In the fluid treatment method of the fourth aspect, heat corresponding to the quantity of heat that the fluid-for-cooling has absorbed when passing through the adsorption unit is recovered, whereby the quantity of heat that becomes necessary for heating for obtaining the third fluid can be kept small.

In the fluid treatment method of the fifth aspect, it becomes possible to continuously perform the treatment for adsorbing the first component using the regenerated adsorption unit.

In the fluid treatment method of the sixth aspect, it becomes possible to effectively reduce the carbon dioxide concentration.

In the fluid treatment apparatus of the seventh aspect, the ability to adsorb the first component in a case where the first fluid has been caused to pass through the regenerated adsorption unit can be further improved.

In the fluid treatment apparatus of the eighth aspect, the second component can be suppressed from being adsorbed in the adsorption unit at the time of the cooling of the adsorption unit.

In the fluid treatment apparatus of the ninth aspect, the quantity of heat that becomes necessary for heating for obtaining the fifth fluid can be kept small.

In the fluid treatment apparatus of the tenth aspect, the ability to adsorb the first component in a case where the first fluid has been caused to pass through the regenerated adsorption unit can be further improved.

In the fluid treatment apparatus of the eleventh aspect, the second component can be suppressed from being adsorbed in the adsorption unit at the time of the cooling of the adsorption unit.

In the fluid treatment apparatus of the twelfth aspect, the quantity of heat that becomes necessary for heating for obtaining the fifth fluid can be kept small.

In the fluid treatment apparatus of the thirteenth aspect, in a case where the fifth fluid is caused to pass through the portion of the adsorption unit through which the first fluid has passed to thereby regenerate that portion, the adsorption quantity of the first component after regeneration can be kept lower.

In the fluid treatment apparatus of the fourteenth aspect, it becomes possible to continuously and automatically perform the treatment for adsorbing the first component using the regenerated adsorption unit.

In the fluid treatment apparatus of the fifteenth aspect, it becomes possible to effectively reduce the carbon dioxide concentration.

In the fluid of the sixteenth aspect, the concentration of the first component can be further reduced.

In the fluid of the seventeenth aspect, the concentration of the first component can be further reduced.

DESCRIPTION OF EMBODIMENTS

<1> First Embodiment

<1-1> Schematic Configuration of Carbon Dioxide Concentration Reducing Apparatus 1

Figure 1:
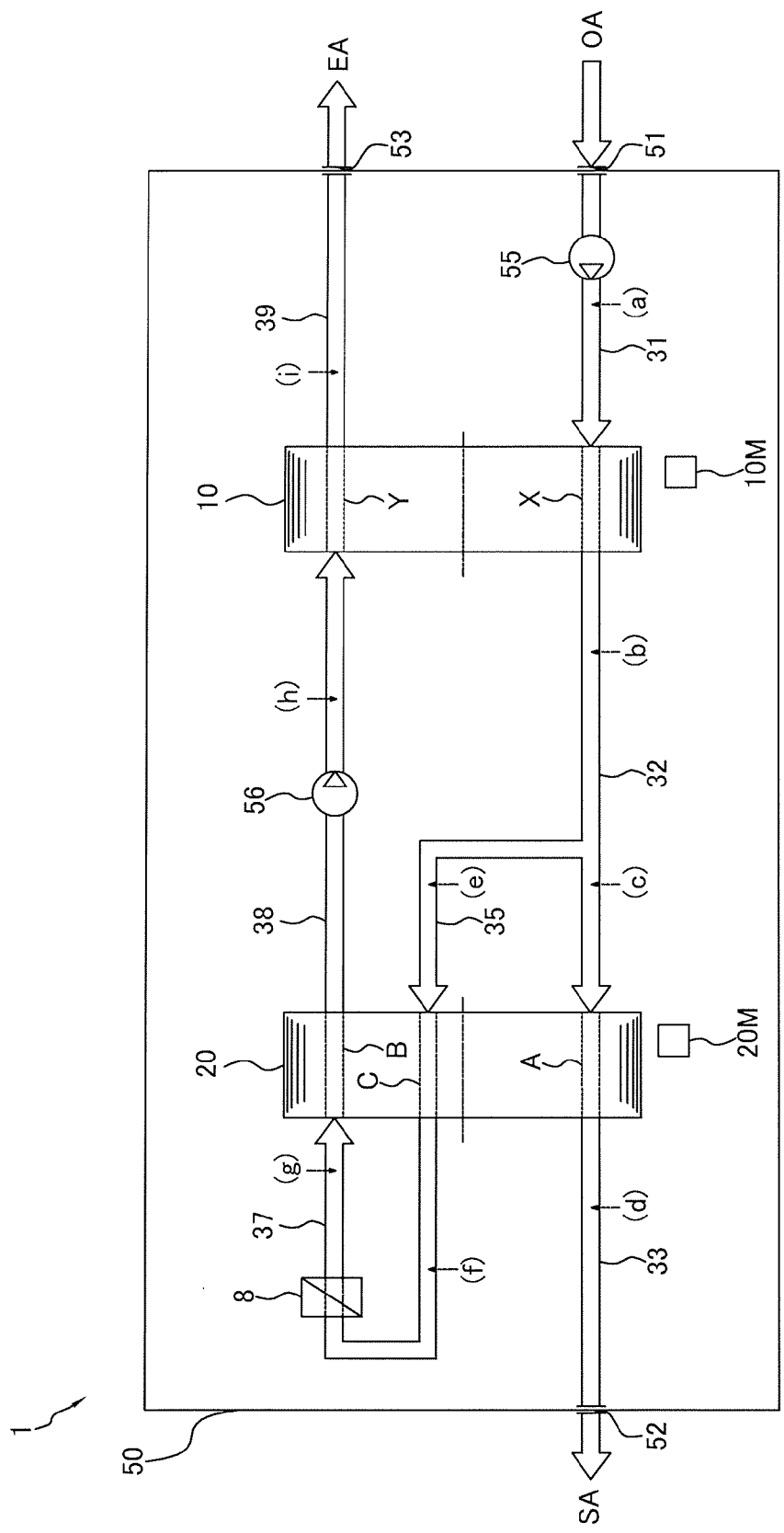
FIG. 1 is a schematic configuration diagram of a carbon dioxide concentration reducing apparatus pertaining to a first embodiment of the present invention.

FIG. 1 shows a schematic configuration diagram of a carbon dioxide concentration reducing apparatus 1 pertaining to a first embodiment of the present invention.

The carbon dioxide concentration reducing apparatus 1 is an apparatus that takes in outdoor air and supplies air whose carbon dioxide concentration is low to a target space, and the carbon dioxide concentration reducing apparatus 1 is equipped with a casing 50, a first rotor 10, a first motor 10M, a second rotor 20, a second motor 20M, an air supply fan 55, an air exhaust fan 56, a heater 8, and ducts 31, 32, 33, 35, 37, 38, and 39.

The casing 50 has an outdoor air intake opening 51 that opens to the outdoors, an air supply opening 52 that opens to the target space, and an air exhaust opening 53 that opens to the outdoors.

Figure 2:
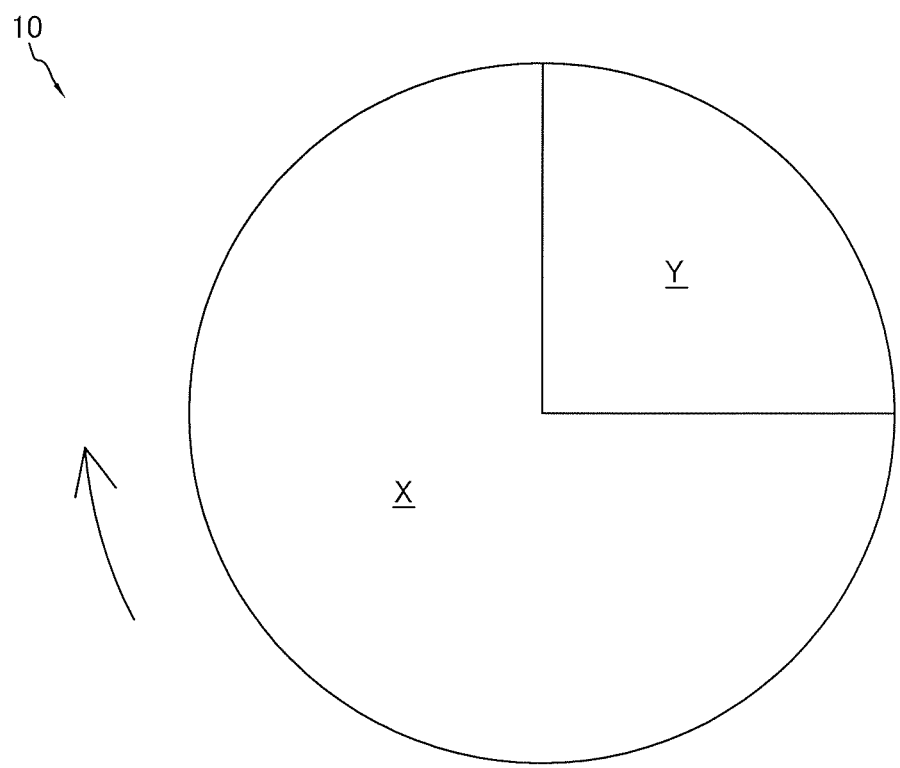
FIG. 2 is a schematic explanatory diagram of a first rotor pertaining to the first embodiment.

The first rotor 10 is placed inside the casing 50, has a substantially cylindrical shape configured by silica gel with a honeycomb structure, and can allow air to pass though it in its axial direction. As shown in FIG. 2, which is a schematic configuration diagram of the first rotor 10 as seen from the outdoor air intake opening 51 and air exhaust opening 53 side, the upper right half (corresponding to 90°) of the first rotor 10 is a water regeneration position Y, and the remaining portion (corresponding to 270°) of the first rotor 10 is a water adsorption position X. When air passes through the water adsorption position X, water included in the passing air is adsorbed on the silica gel, whereby dried air flows out. When heated air passes through the water regeneration position Y, the water that had been adsorbed on the silica gel is desorbed, whereby air whose humidity has increased flows out and the part of the first rotor 10 through which the heated air passes is regenerated. The ability of the silica gel in this first rotor 10 to adsorb water is temperature dependent, and the lower the temperature of the first rotor 10 is, the more the silica gel tends to adsorb water, and the higher the temperature of the first rotor 10 is, the more the water tends to desorb from the silica gel.

The first motor 10M causes the first rotor 10 to rotate about a substantially cylindrical shaft. Specifically, the first motor 10M causes the first rotor 10 to rotate as a result of the driving force of the first motor 10M being transmitted to the first rotor 10 via an unillustrated rope-for-driving that surrounds the substantially cylindrical first rotor 10 from its circumferential direction. Because of this, the first rotor 10 can alternate between and continuously perform water adsorption and regeneration by desorption.

Figure 3:
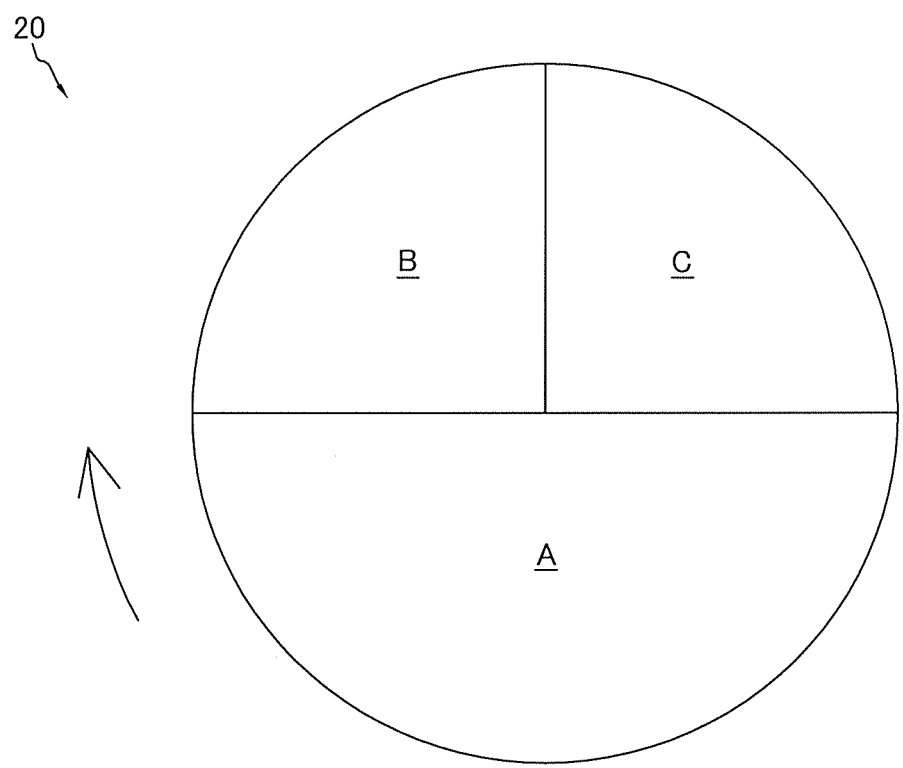
FIG. 3 is a schematic explanatory diagram of a second rotor pertaining to the first embodiment.

The second rotor 20 is placed inside the casing 50, has a substantially cylindrical shape configured by a zeolite with a honeycomb structure, and can allow air to pass though it in its axial direction. As shown in FIG. 3, which is a schematic configuration diagram of the second rotor 20 as seen from the outdoor air intake opening 51 and air exhaust opening 53 side, the lower half of the second rotor 20 is a carbon dioxide adsorption position A, the upper left half of the second rotor 20 is a thermal regeneration position B, and the upper right half of the second rotor 20 is a cooling regeneration position C. When air passes through the carbon dioxide adsorption position A, carbon dioxide included in the passing air is adsorbed on the zeolite, whereby air whose carbon dioxide concentration has been reduced flows out. When heated air passes through the thermal regeneration position B, the carbon dioxide that had been adsorbed on the zeolite is desorbed, whereby air whose carbon dioxide concentration has increased flows out and the part of the second rotor 20 through which the heated air passes is regenerated. When unheated air (air whose temperature is lower than that of the air after having passed through the heater 8) passes through the cooling regeneration position C, the heat in the position through which the heated air had passed is radiated, whereby the carbon dioxide adsorption capacity in the portion of the second rotor 20 through which the unheated air has passed increases and is regenerated. The ability of the zeolite in this second rotor 20 to adsorb carbon dioxide is temperature dependent, and the lower the temperature of the second rotor 20 is, the more the zeolite tends to adsorb carbon dioxide, and the higher the temperature of the second rotor 20 is, the more the carbon dioxide tends to desorb from the zeolite. Further, the zeolite in this second rotor 20 not only has the ability to adsorb carbon dioxide but also has the ability to adsorb water and tends to preferentially adsorb water.

Like the first motor 10M, the second motor 20M causes the second rotor 20 to rotate about a substantially cylindrical shaft. Because of this, the second rotor 20 can alternate between carbon dioxide adsorption and regeneration by desorption and can continuously perform a carbon dioxide concentration reduction treatment.

A first air supply duct 31 configures a flow path that leads the air that has been taken into the casing 50 from the outdoor air intake opening 51 in the casing 50 to the water adsorption position X of the first rotor 10.

The air supply fan 55 is placed in the middle of the first air supply duct 31. When this air supply fan 55 is driven, outdoor air OA is sent through the first air supply duct 31 toward the first rotor 10.

A second air supply duct 32 configures a flow path that leads the air that has passed via the first air supply duct 31 through the water adsorption position X of the first rotor 10 to the carbon dioxide adsorption position A of the second rotor 20.

A target space air supply duct 33 configures a flow path that leads the air that has passed via the second air supply duct 32 through the carbon dioxide adsorption position A of the second rotor 20 to the target space. Via this target space air supply duct 33, supply air SA whose humidity is low and whose carbon dioxide concentration is also low is supplied with respect to the target space.

A cooling duct 35 configures a flow path that branches from the middle of the second air supply duct 32, extends to the cooling regeneration position C of the second rotor 20, and leads some of the air passing through the second air supply duct 32 to the cooling regeneration position C of the second rotor 20.

A second regeneration duct 37 configures a flow path that leads the air that has passed via the cooling duct 35 through the cooling regeneration position C of the second rotor 20 to the thermal regeneration position B.

The heater 8 is placed in the middle of the second regeneration duct 37. This heater 8 heats the air passing through the second regeneration duct 37.

A first regeneration duct 38 configures a flow path that leads the air that has passed via the second regeneration duct 37 through the thermal regeneration position B of the second rotor 20 to the water regeneration position Y of the first rotor 10.

The air exhaust fan 56 is placed in the middle of the first regeneration duct 38. When this air exhaust fan 56 is driven, air is sent through the first regeneration duct 38 toward the first rotor 10.

An air exhaust duct 39 configures a flow path that exhausts, as exhaust air EA to the outdoors, the air that has passed via the first regeneration duct 38 through the water regeneration position Y of the first rotor 10.

<1-2> Carbon Dioxide Concentration Reduction Procedure

A carbon dioxide concentration reduction procedure will be described below while describing the air passing through points (a) to (i) in FIG. 1. Here, the first rotor 10 and the second rotor 20 continue rotating in the directions indicated by the arrows in FIG. 2 and FIG. 3 respectively.

The air passing through the portion indicated by (a) in FIG. 1 is the outdoor air OA that has been taken in via the outdoor air intake opening 51 in the casing 50, and this air flows toward the first rotor 10.

The air passing through the portion indicated by (b) in FIG. 1 is air that has been dried as a result of passing through the water adsorption position X of the first rotor 10, and this air flows toward the carbon dioxide adsorption position A or the cooling regeneration position C of the second rotor 20. The portion of the first rotor 10 that has adsorbed the water in the water adsorption position X moves to the water regeneration position Y as a result of the first rotor 10 rotating while it holds the adsorbed water and each portion of the first rotor 10 relatively moving with respect to the first air supply duct 31, the second air supply duct 32, the first regeneration duct 38, and the air exhaust duct 39.

The air passing through the portion indicated by (c) in FIG. 1 is dried air like in (b) described above, and this air flows toward the carbon dioxide adsorption position A of the second rotor 20.

The air passing through the portion indicated by (d) in FIG. 1 is dry air whose carbon dioxide concentration has been reduced as a result of the dried air passing through the carbon dioxide adsorption position A of the second rotor 20, and this air flows toward the target space. The portion of the second rotor 20 that has adsorbed the carbon dioxide in the carbon dioxide adsorption position A moves to the thermal regeneration position B as a result of the second rotor 20 rotating while it holds the adsorbed carbon dioxide and each portion of the second rotor 20 relatively moving with respect to the second air supply duct 32, the target space air supply duct 33, the cooling duct 35, and the second regeneration duct 37.

The air passing through the portion indicated by (e) in FIG. 1 is dried air like in (b) described above, and this air flows toward the cooling regeneration position C of the second rotor 20.

The air passing through the portion indicated by (f) in FIG. 1 is air after having passed through the cooling regeneration position C of the second rotor 20, and this air obtains heat (recovers heat) from the cooling regeneration position C of the second rotor 20 whereby its temperature becomes higher than that of the air passing through (e). The air passing through the cooling regeneration position C of the second rotor 20 is dry air with little water because it is air after having passed through the water adsorption position X of the first rotor 10. Further, the portion of the second rotor 20 that moves to the cooling regeneration position C as a result of the second rotor 20 rotating is positioned in the thermal regeneration position B until just before and its temperature becomes higher. For this reason, water can be suppressed from being adsorbed on the second rotor 20 when passing through the cooling regeneration position C of the second rotor 20. On the other hand, the second rotor 20 moves toward the carbon dioxide adsorption position A in a state in which its ability to adsorb carbon dioxide has been improved by the cooling resulting from the air passing through the cooling regeneration position C. When passing through the cooling regeneration position C of the second rotor 20, carbon dioxide is adsorbed and the carbon dioxide concentration is slightly reduced, but because the second rotor 20 is positioned in the thermal regeneration position B until just before and its temperature becomes higher, a large quantity of carbon dioxide can be suppressed from being adsorbed on the portion of the second rotor 20 before the second rotor 20 moves to the carbon dioxide adsorption position A.

The air passing through the portion indicated by (g) in FIG. 1 is air that has been dried as a result of passing through the water adsorption position X of the first rotor 10 and whose carbon dioxide concentration has been slightly reduced as a result of passing through the cooling regeneration position C of the second rotor 20 and which has been heated by the heater 8, and this air flows toward the thermal regeneration position B of the second rotor 20. Additionally, the heated air that has been dried in this way and whose carbon dioxide concentration is low is continuously supplied to the thermal regeneration position B of the second rotor 20.

Figure 4:
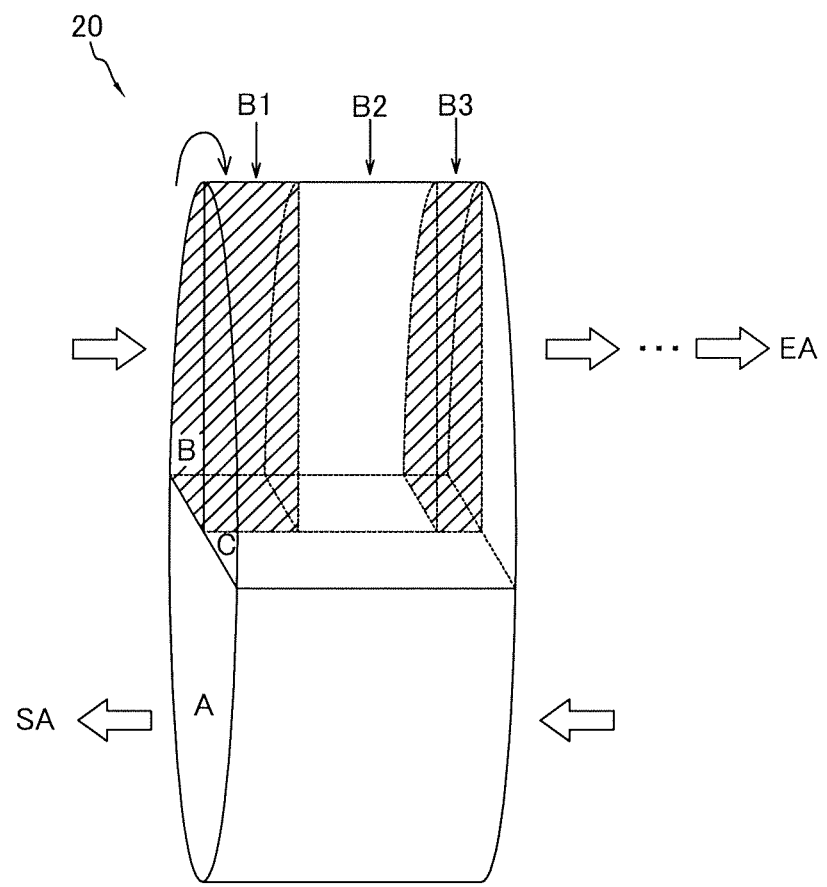
FIG. 4 is an explanatory diagram relating to a thermal regeneration position of the second rotor pertaining to the first embodiment.

Here, as shown in FIG. 4, the heated air whose carbon dioxide concentration is low and which flows into the thermal regeneration position B of the second rotor 20 sequentially passes through an inlet-side portion B1, an inside portion B2, and an outlet-side portion B3 of the thermal regeneration position B of the second rotor 20. In this case, the inlet-side portion B1 of the thermal regeneration position B of the second rotor 20 into which the heated air with the highest temperature flows is warmed first. Then, when the inlet-side portion B1 becomes warm, the inside portion B2 is warmed next. Then, the outlet-side portion B3 is warmed last. In a situation in which the outlet-side portion B3 is warmed last in this way, a state in which not only the outlet-side portion B3 but also the inlet-side portion B1 and the inside portion B2 have been warmed is maintained. For this reason, carbon dioxide can be desorbed to a high degree not only in the inside portion B2 and the outlet-side portion B3 but also in the inlet-side portion B1 of the thermal regeneration position B of the second rotor 20. Specifically, for example, in a case where unheated air is caused to pass through a rotor that has been warmed beforehand, the air passing through the rotor is gradually warmed as it advances inside the rotor, so a state in which air that has not been sufficiently warmed passes through the portion in the neighborhood of the inlet ends up continuing, but in the carbon dioxide concentration reducing apparatus 1, this problem can be avoided.

The air passing through the portion indicated by (h) in FIG. 1 is air whose carbon dioxide concentration has increased due to the carbon dioxide that the second rotor 20 had adsorbed in the carbon dioxide adsorption position A being desorbed as a result of the heated air that has been dried and whose carbon dioxide concentration has been reduced passing through the thermal regeneration position B of the second rotor 20, and this air flows toward the water regeneration position Y of the first rotor 10. In this way, the second rotor 20 is regenerated as a result of the carbon dioxide that it had adsorbed being desorbed. All of the air flowing into the second rotor 20 is air that has been dried as a result of passing through the water adsorption position X of the first rotor 10, so the desorption quantity of water when passing through the thermal regeneration position B of the second rotor 20 is small.

The air passing through the portion indicated by (i) in FIG. 1 is air that has come to include a lot of water due to the water that the first rotor 10 had adsorbed in the water adsorption position X being desorbed as a result of the dried heated air after having passed through the thermal regeneration position B of the second rotor 20 passing through the water regeneration position Y of the first rotor 10, and this air is exhausted to the outdoors. In this way, the first rotor 10 is regenerated as a result of the water that it had adsorbed being desorbed.

<1-3> Characteristics of First Embodiment

In the carbon dioxide concentration reducing apparatus 1 of the first embodiment, the air passing through the portion indicated by (g) in the second regeneration duct 37 in FIG. 1 is air that has been dried as a result of passing through the water adsorption position X of the first rotor 10 and has been heated by the heater 8. For this reason, the air heading toward the thermal regeneration position B of the second rotor 20 is always in a dried heated state, and the air in this dried heated state is continuously supplied to the thermal regeneration position B of the second rotor 20. Because of this, the thermal regeneration position B of the second rotor 20 is sequentially warmed from its upwind side, and the upwind side to the downwind side of the portion that is to be thermally regenerated is wholly sufficiently warmed by the time the second rotor 20 rotates and the portion that had been in the thermal regeneration position B reaches the cooling regeneration position C. The concentration of carbon dioxide in the air passing through the thermal regeneration position B of the second rotor 20 gradually increases as the air heads to the downwind side, and the carbon dioxide can be sufficiently desorbed by the time the second rotor 20 rotates and the portion that had been in the thermal regeneration position B reaches the cooling regeneration position C.

Further, the air passing through the thermal regeneration position B of the second rotor 20 is not only dried as a result of passing through the water adsorption position X of the first rotor 10 and heated by the heater 8 but its carbon dioxide concentration is—albeit slightly—reduced as a result of passing through the cooling regeneration position C of the second rotor 20. Because of this, the air heading toward the thermal regeneration position B of the second rotor 20 is dried and in a heated state in which its carbon dioxide concentration has been reduced, so the desorption of carbon dioxide in the thermal regeneration position B of the second rotor 20 can be performed to a high degree compared to the case of leading air on which no carbon dioxide concentration reduction treatment has been administered.

<1-4> Modifications of First Embodiment (A)

In the first embodiment, as shown in FIG. 3, the second rotor 20 in which the size of the thermal regeneration position B and the size of the cooling regeneration position C are equal was taken as an example and described.

Figure 5:
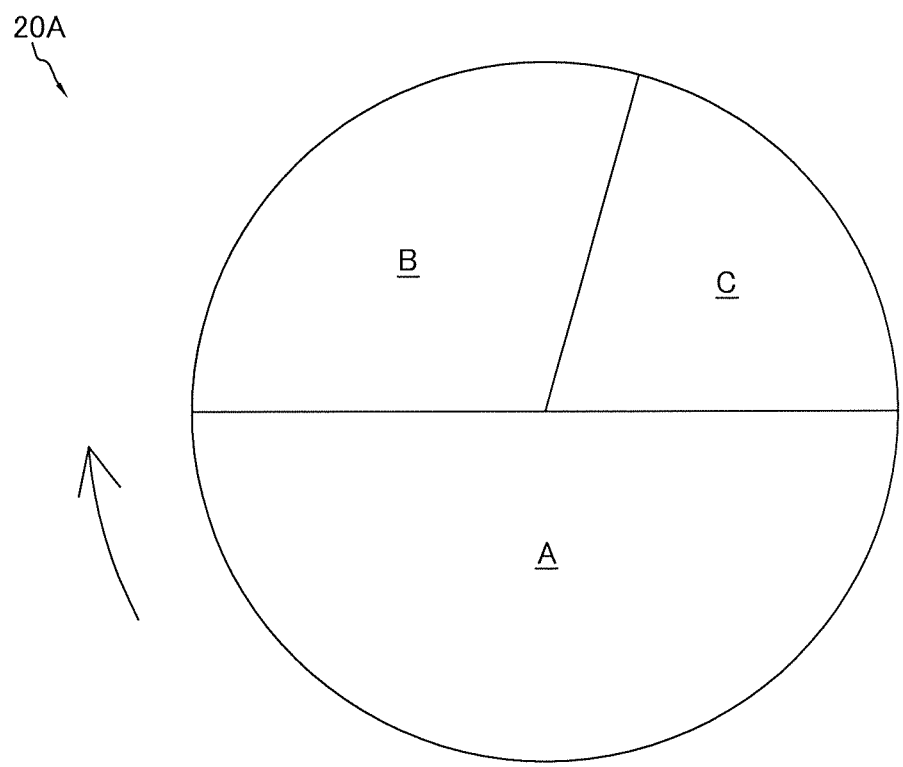
FIG. 5 is a schematic configuration diagram of a carbon dioxide concentration reducing apparatus pertaining to modification (A) of the first embodiment.

However, the present invention is not limited to the second rotor 20; for example, as shown in FIG. 5, a second rotor 20A may also be employed. This second rotor 20A is configured such that the size of a thermal regeneration position B' is larger than the size of a cooling regeneration position C'. In this way, by increasing the size of the thermal regeneration position B', desorption of carbon dioxide can be more effectively or more reliably performed.

Further, in a case where it is necessary for the carbon dioxide adsorbed on the zeolite to be desorbed rapidly or to a high degree, such as a case where the rotational speed of the second rotor 20A is quick, a case where the volume of air passing through the carbon dioxide adsorption position A is large, or a case where the axial direction thickness of the second rotor 20A is thick, the zeolite can be sufficiently regenerated by ensuring a large thermal regeneration position B' in this way. Because of this, the ability of the portion of the second rotor 20A that moves to the carbon dioxide adsorption position A to adsorb carbon dioxide can be improved, so the concentration of carbon dioxide in the air supplied to the target space can be effectively reduced.

(B)

In the first embodiment, as shown in FIG. 2, the first rotor 10 whose upper right half is the water regeneration position Y and whose remaining portion is the water adsorption position X was taken as an example and described.

However, the present invention is not limited to the first rotor 10; for example, the proportions of the water regeneration position Y and the water adsorption position X may also be appropriately changed. For example, in a case where the load for desorbing the water is large compared to the adsorption quantity, the area of the water regeneration position Y may be more widely disposed than the area of the water adsorption position X, and in a case where the area needed for adsorbing the water is large and where the rotational speed can be kept low and a long regeneration time can be ensured, the area of the water adsorption position X may be disposed more widely than the area of the water regeneration position Y. Further, the area percentages of the water adsorption position X and the water regeneration position Y may also be designed so as to be 50% each.

(C)

In the first embodiment, a case where the carbon dioxide concentration is slightly reduced in regard to the air passing through the cooling regeneration position C of the second rotor 20 was taken as an example and described.

However, the present invention is not limited to this; for example, the present invention may also be applied to a case where the carbon dioxide concentration is maintained without being reduced, or a case where the carbon dioxide concentration ends up rising slightly, even when the air passes through the cooling regeneration position C of the second rotor 20. Even in such cases, the effect of thermally regenerating the second rotor 20 can be sufficiently obtained by supplying the air that has been sufficiently heated by the heater 8 to the thermal regeneration position B of the second rotor 20.

<2> Second Embodiment

<2-1> Schematic Configuration of Carbon Dioxide Concentration Reducing Apparatus 201

Figure 6:
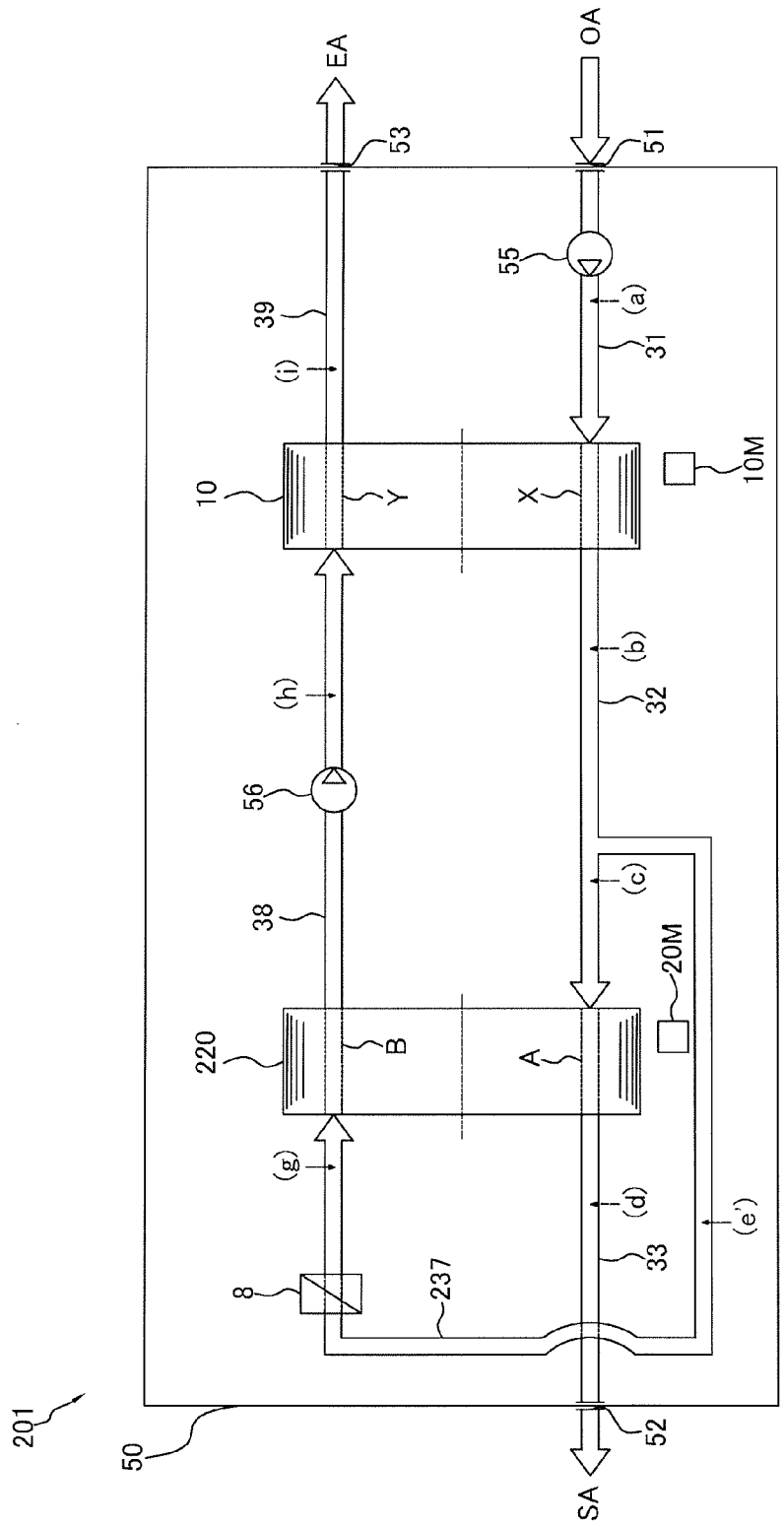
FIG. 6 is a schematic configuration diagram of a carbon dioxide concentration reducing apparatus pertaining to a second embodiment.

FIG. 6 shows a schematic configuration diagram of a carbon dioxide concentration reducing apparatus 201 pertaining to a second embodiment of the present invention. In FIG. 6, portions indicated by the same reference signs as the reference signs described in the first embodiment are generally the same, and description thereof will be omitted.

The carbon dioxide concentration reducing apparatus 201 is equipped with a second regeneration duct 237 instead of the cooling duct 35 and the second regeneration duct 37 in the first embodiment and is equipped with a second rotor 220 instead of the second rotor 20.

The second regeneration duct 237 configures a flow path that branches from the middle of the second air supply duct 32 and leads to the thermal regeneration position B. Additionally, the heater 8 is disposed in the middle of this second regeneration duct 237.

The air passing through the portion indicated by (e') in FIG. 6 is air that has been dried as a result of passing through the water adsorption position X of the first rotor 10, and this air flows toward the thermal regeneration position B of the second rotor 220.

Figure 7:
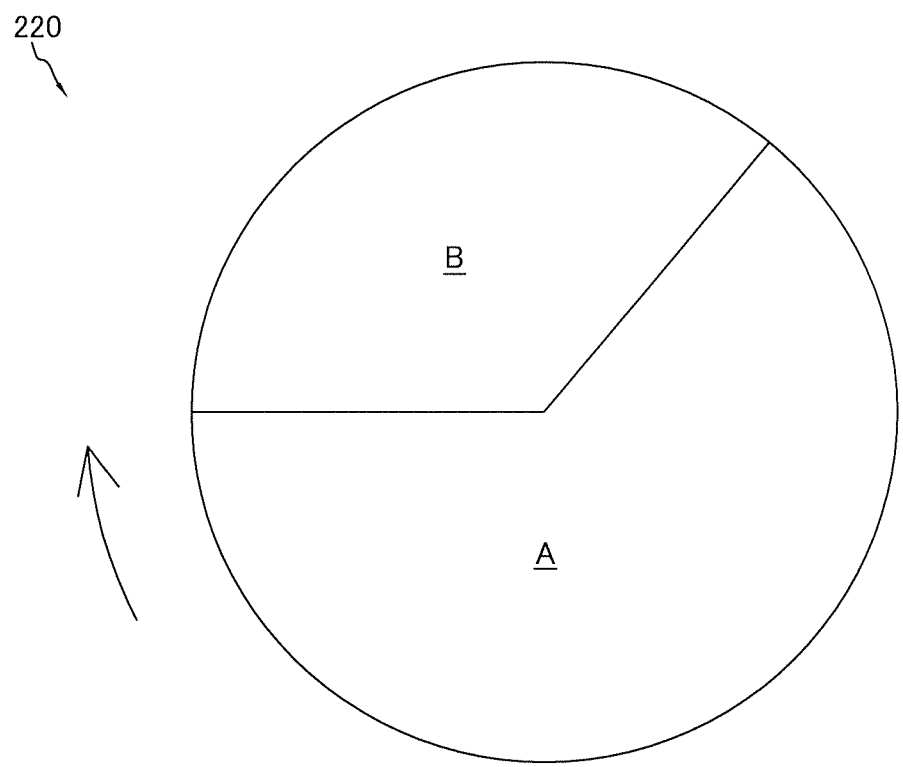
FIG. 7 is a schematic explanatory diagram of a second rotor pertaining to the second embodiment.

In the second rotor 220, as shown in FIG. 7, the carbon dioxide adsorption position A and the thermal regeneration position B are disposed but the cooling regeneration position C described in the first embodiment is not disposed.

<2-2> Characteristics of Second Embodiment

In the second rotor 20 of the first embodiment, carbon dioxide is adsorbed and the carbon dioxide concentration is slightly reduced in the cooling regeneration position C before the second rotor 20 moves toward the carbon dioxide adsorption position A. Additionally, the air that has passed through the cooling regeneration position C is not supplied to the target space but is utilized as air for thermally regenerating the second rotor 20 in the thermal regeneration position B.

With respect thereto, in the carbon dioxide concentration reducing apparatus 201 of the second embodiment, in contrast to the carbon dioxide concentration reducing apparatus 1 of the first embodiment, the cooling regeneration position C is not disposed. For this reason, the portion of the second rotor 220 that moves toward the carbon dioxide adsorption position A is the portion that has just passed through the thermal regeneration position B and has not yet adsorbed carbon dioxide. In this way, air from which carbon dioxide has been efficiently adsorbed as a result of being caused to pass through the portion of the second rotor 220 that is in a state in which carbon dioxide has been sufficiently desorbed by the thermal regeneration position B can be supplied to the target space.

The portion of the second rotor 220 that is heated as a result of passing through the thermal regeneration position B is gradually cooled by the air passing through the carbon dioxide adsorption position A while that portion moves through the carbon dioxide adsorption position A by rotation. For this reason, adsorption of carbon dioxide by the second rotor 220 in the cooled state is also possible even though it starts from the middle of the carbon dioxide adsorption position A.

<3> Third Embodiment

<3-1> Schematic Configuration of Carbon Dioxide Concentration Reducing Apparatus 301

Figure 8:
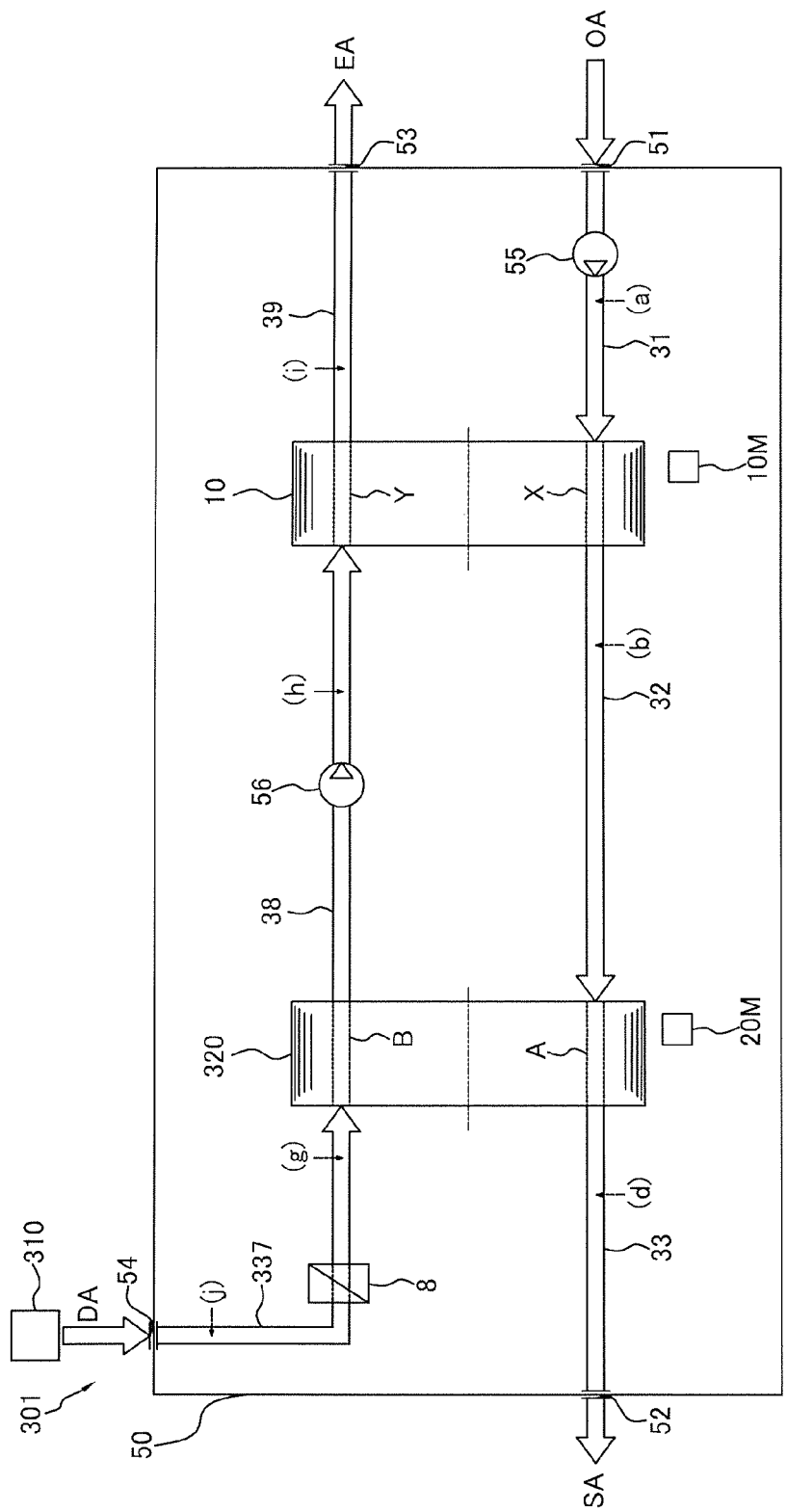
FIG. 8 is a schematic configuration diagram of a carbon dioxide concentration reducing apparatus pertaining to a third embodiment.

FIG. 8 shows a schematic configuration diagram of a carbon dioxide concentration reducing apparatus 301 pertaining to a third embodiment of the present invention. In FIG. 8, portions indicated by the same reference signs as the reference signs described in the first embodiment are generally the same, and description thereof will be omitted.

The carbon dioxide concentration reducing apparatus 301 is equipped with a second regeneration duct 337 instead of the cooling duct 35 and the second regeneration duct 37 in the first embodiment and is equipped with a second rotor 320 instead of the second rotor 20. Moreover, the carbon dioxide concentration reducing apparatus 301 can utilize dry air DA that has been produced in a dry air producing device 310 for thermal regeneration of the second rotor 320.

In the casing 50, a dry air intake opening 54 for taking in the externally produced dry air DA is formed.

The second regeneration duct 337 configures a flow path that leads from the dry air intake opening 54 in the casing 50 to the thermal regeneration position B of the second rotor 320. Additionally, the heater 8 is disposed in the middle of this second regeneration duct 337.

The air passing through the portion indicated by (j) in FIG. 8 is the externally produced dry air DA, and this air flows toward the thermal regeneration position B of the second rotor 320.

In the second rotor 320, the carbon dioxide adsorption position A and the thermal regeneration position B are disposed but the cooling regeneration position C described in the first embodiment is not disposed.

<3-2> Characteristics of Third Embodiment

In the carbon dioxide concentration reducing apparatus 301 of the third embodiment, like the carbon dioxide concentration reducing apparatus 201 of the second embodiment, the cooling regeneration position C is not disposed. For this reason, the portion of the second rotor 320 that moves toward the carbon dioxide adsorption position A is the portion that has just passed through the thermal regeneration position B and has not yet adsorbed carbon dioxide. In this way, air from which carbon dioxide has been efficiently adsorbed as a result of being caused to pass through the portion of the second rotor 320 that is in a state in which carbon dioxide has been sufficiently desorbed in the thermal regeneration position B can be supplied to the target space.

Like the carbon dioxide concentration reducing apparatus 201 of the second embodiment, the portion of the second rotor 320 that is heated as a result of passing through the thermal regeneration position B is gradually cooled by the air passing through the carbon dioxide adsorption position A while that portion moves through the carbon dioxide adsorption position A by rotation. For this reason, adsorption of carbon dioxide by the second rotor 320 in a cooled state is also possible even though it starts from the middle of the carbon dioxide adsorption position A.

In the carbon dioxide concentration reducing apparatus 301 of the third embodiment, a flow for supplying air whose carbon dioxide concentration is low to the target space and a flow for thermally regenerating the second rotor 320 are independently disposed. For this reason, by controlling the output of the air supply fan 55 and the output of the air exhaust fan 56, the treatment load can be regulated to become a treatment load corresponding to the carbon dioxide adsorption speed, desorption speed, air supply volume, air exhaust volume, etc. Because of this, it becomes possible to suppress the second rotor 320 from being for a long time in the carbon dioxide adsorption position A while the adsorption state of the zeolite of the second rotor 320 remains saturated and to sufficiently ensure thermal regeneration by regulating the supply quantity of the dry air DA.

<3-3> Modifications of Third Embodiment (A)

In the carbon dioxide concentration reducing apparatus 301 of the third embodiment, a case where the dry air DA obtained by the dry air producing device 310 is supplied to the thermal regeneration position B of the second rotor 320 was taken as an example and described.

Figure 9:
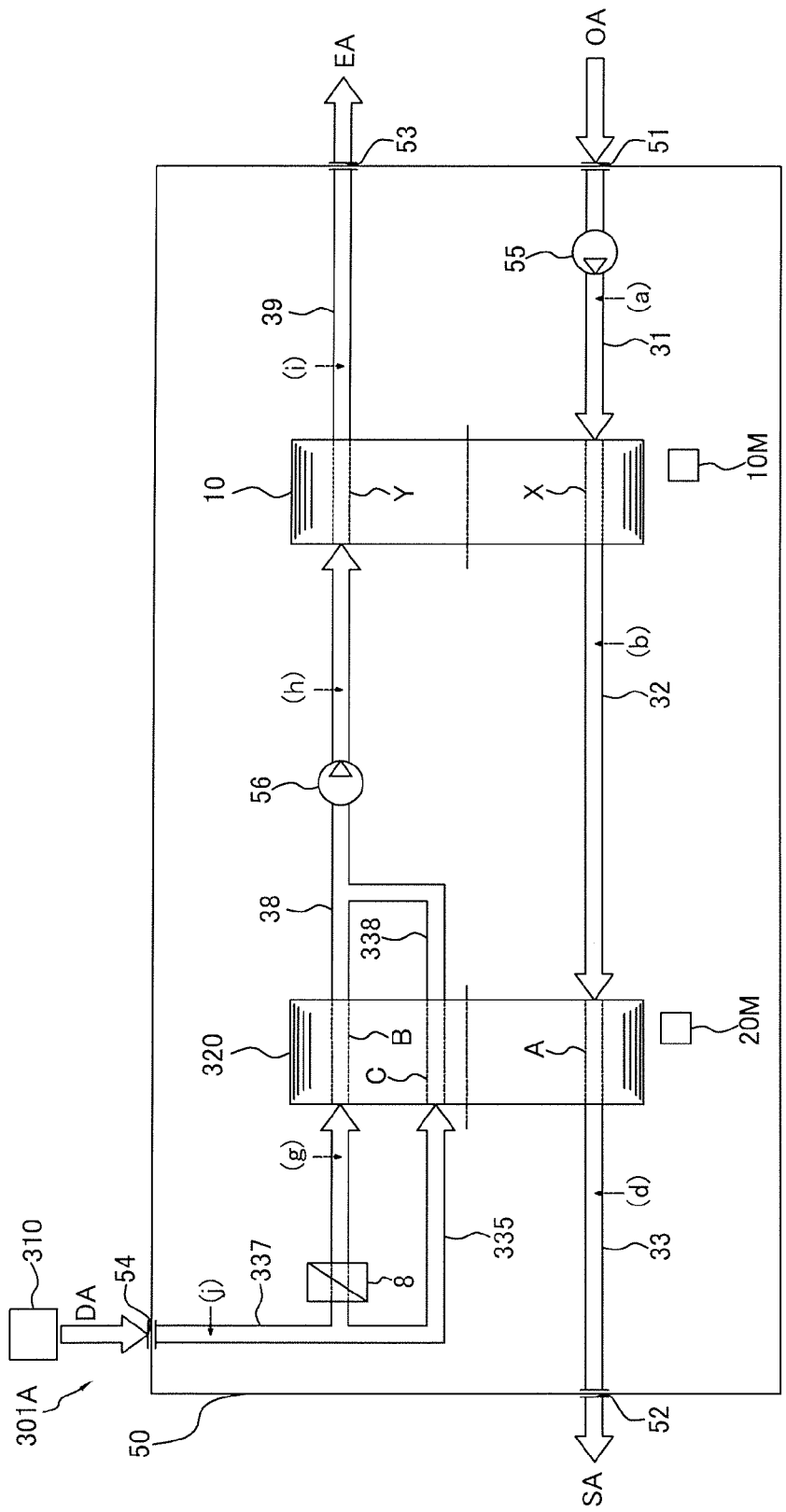
FIG. 9 is a schematic configuration diagram of a carbon dioxide concentration reducing apparatus pertaining to modification (A) of the third embodiment.

However, the present invention is not limited to this; for example, as shown in FIG. 9, the present invention may also be applied to a carbon dioxide concentration reducing apparatus 301A that is further equipped with a before-cooling duct 335 and an after-cooling duct 338, whereby the cooling regeneration position C is disposed in the second rotor 320.

This before-cooling duct 335 branches from the second regeneration duct 337 on the upstream side of the heater 8 and extends to the cooling regeneration position C of the second rotor 320. The after-cooling duct 338 configures a flow path that causes the air that has passed through the cooling regeneration position C of the second rotor 320 to merge with the middle of the first regeneration duct 38.

According to this carbon dioxide concentration reducing apparatus 301A, air that has been dried and whose carbon dioxide concentration is low and which is supplied to the target space can be more efficiently obtained, and the regeneration of the second rotor 320 can be performed to a higher degree.

(B)

Figure 10:
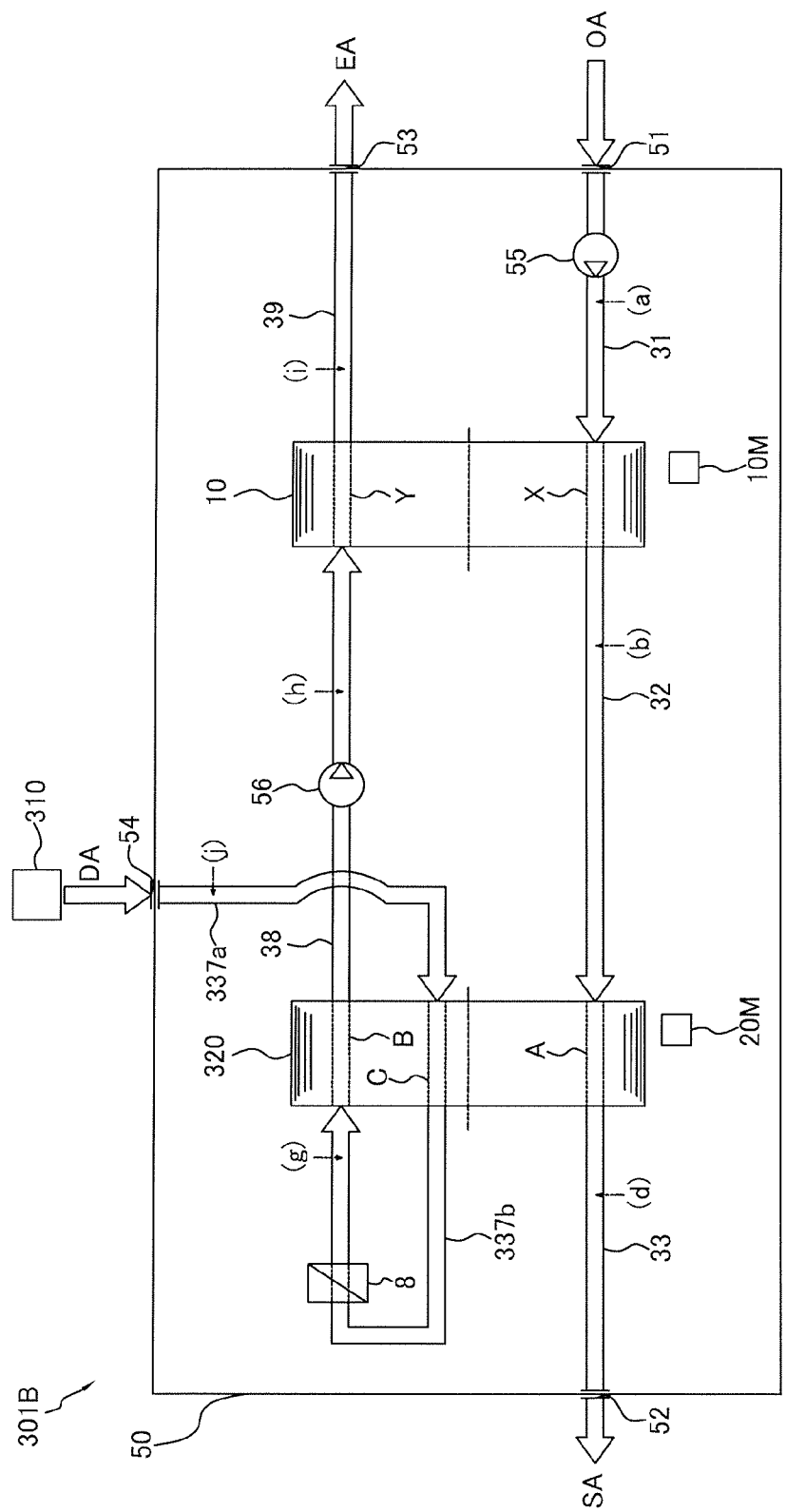
FIG. 10 is a schematic configuration diagram of a carbon dioxide concentration reducing apparatus pertaining to modification (B) of the third embodiment.

Further, for example, as shown in FIG. 10, the present invention may also be applied to a carbon dioxide concentration reducing apparatus 301B that is further equipped with a before-cooling duct 337a and an after-cooling duct 337b, whereby the cooling regeneration position C is disposed in the second rotor 320.

This before-cooling duct 337a configures a flow path that supplies the air that has been produced by the dry air producing device 310 to the cooling regeneration position C of the second rotor 320. The after-cooling duct 337b configures a flow path that supplies the air that has passed through the cooling regeneration position C of the second rotor 320 to the thermal regeneration position B of the second rotor 320 via the heater 8.

According to this carbon dioxide concentration reducing apparatus 301B, air that has been dried and whose carbon dioxide concentration is low and which is supplied to the target space can be more efficiently obtained, and the regeneration of the second rotor 320 can be performed to a higher degree.

<4> Fourth Embodiment

<4-1> Schematic Configuration of Carbon Dioxide Concentration Reducing Apparatus 401

Figure 11:
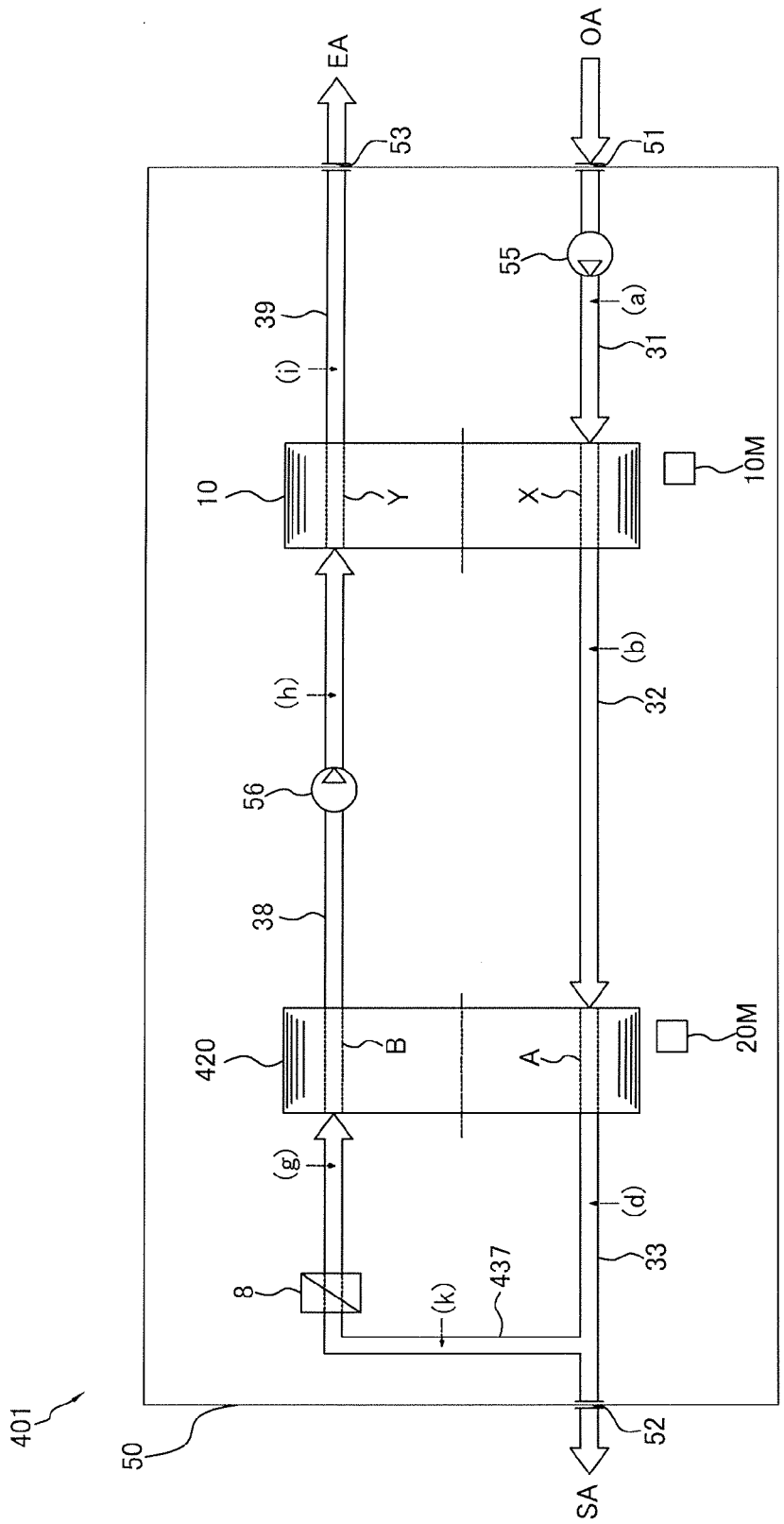
FIG. 11 is a schematic configuration diagram of a carbon dioxide concentration reducing apparatus pertaining to a fourth embodiment.

FIG. 11 shows a schematic configuration diagram of a carbon dioxide concentration reducing apparatus 401 pertaining to a fourth embodiment of the present invention. In FIG. 11, portions indicated by the same reference signs as the reference signs described in the first embodiment are generally the same, and description thereof will be omitted.

The carbon dioxide concentration reducing apparatus 401 is equipped with a second regeneration duct 437 instead of the cooling duct 35 and the second regeneration duct 37 in the first embodiment and is equipped with a second rotor 420 instead of the second rotor 20.

The second regeneration duct 437 configures a flow path that branches from the middle of the target space air supply duct 33 and leads to the thermal regeneration position B of the second rotor 420. Additionally, the heater 8 is disposed in the middle of this second regeneration duct 437.

The air passing through the portion indicated by (k) in FIG. 11 is air that has been dried as a result of passing through the water adsorption position X of the first rotor 10 and whose carbon dioxide concentration has thereafter been reduced as a result of passing through the carbon dioxide adsorption position A of the second rotor 420, and this air flows toward the thermal regeneration position B of the second rotor 420.

In the second rotor 420, the carbon dioxide adsorption position A and the thermal regeneration position B are disposed but the cooling regeneration position C described in the first embodiment is not disposed.

<4-2> Characteristics of Fourth Embodiment

In the carbon dioxide concentration reducing apparatus 401 of the fourth embodiment, like the carbon dioxide concentration reducing apparatus 201 of the second embodiment and the carbon dioxide concentration reducing apparatus 301 of the third embodiment, the cooling regeneration position C is not disposed. For this reason, the portion of the second rotor 420 that moves toward the carbon dioxide adsorption position A is the portion that has just passed through the thermal regeneration position B and has not yet adsorbed carbon dioxide. In this way, air from which carbon dioxide has been efficiently adsorbed as a result of being caused to pass through the portion of the second rotor 420 that is in a state in which carbon dioxide has been sufficiently desorbed in the thermal regeneration position B can be supplied to the target space.

Like the carbon dioxide concentration reducing apparatus 201 of the second embodiment and the carbon dioxide concentration reducing apparatus 301 of the third embodiment, the portion of the second rotor 420 that is heated as a result of passing through the thermal regeneration position B is gradually cooled by the air passing through the carbon dioxide adsorption position A while that portion moves through the carbon dioxide adsorption position A by rotation. For this reason, adsorption of carbon dioxide by the second rotor 420 in a cooled state is also possible even though it starts from the middle of the carbon dioxide adsorption position A.

In the carbon dioxide concentration reducing apparatus 401 of the fourth embodiment, the air supplied to the thermal regeneration position B of the second rotor 420 is air that has been dried as a result of passing through the water adsorption position X of the first rotor 10 and whose carbon dioxide concentration has been reduced as a result of passing through the carbon dioxide adsorption position A of the second rotor 420 and which has been heated by the heater 8. For this reason, air whose carbon dioxide concentration is low can be caused to pass through the thermal regeneration position B, so the carbon dioxide desorption efficiency can be further improved compared to a case where dried heated air is simply caused to pass through.

<5> Fifth Embodiment

<5-1> Schematic Configuration of Carbon Dioxide Concentration Reducing Apparatus 501

Figure 12:
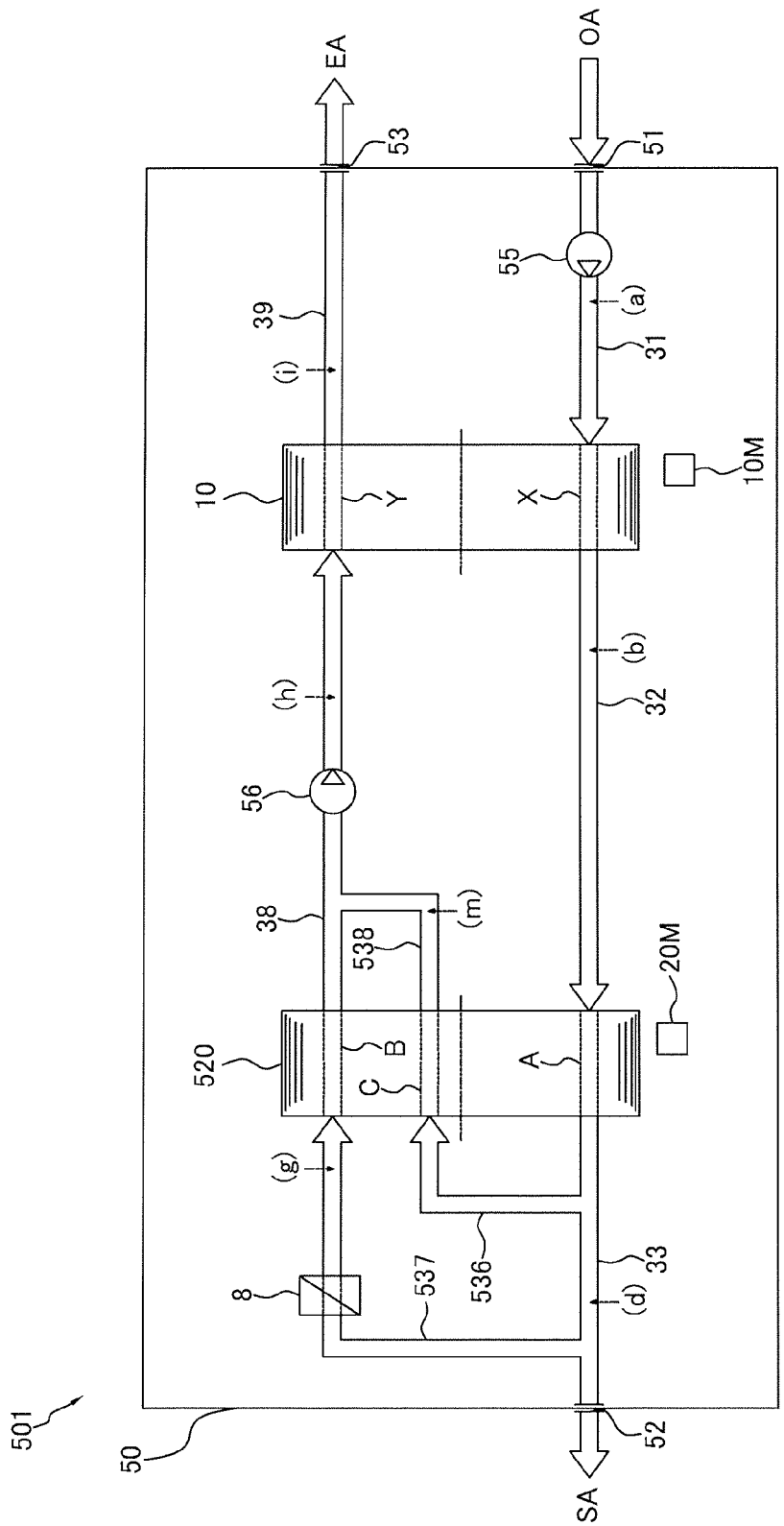
FIG. 12 is a schematic configuration diagram of a carbon dioxide concentration reducing apparatus pertaining to a fifth embodiment.

FIG. 12 shows a schematic configuration diagram of a carbon dioxide concentration reducing apparatus 501 pertaining to a fifth embodiment of the present invention. In FIG. 12, portions indicated by the same reference signs as the reference signs described in the first embodiment are generally the same, and description thereof will be omitted.

The carbon dioxide concentration reducing apparatus 501 is equipped with a before-cooling duct 536, a second regeneration duct 537, and an after-cooling duct 538 instead of the cooling duct 35 and the second regeneration duct 37 in the first embodiment and is equipped with a second rotor 520 instead of the second rotor 20.

The second regeneration duct 537 configures a flow path that branches from the middle of the target space air supply duct 33 and leads to the thermal regeneration position B of the second rotor 520. The heater 8 is disposed in the middle of this second regeneration duct 537. The before-cooling duct 536 configures a flow path that branches from the middle of the target space air supply duct 33 and leads to the cooling regeneration position C of the second rotor 520. The after-cooling duct 538 configures a flow path that causes the air that has passed through the cooling regeneration position C of the second rotor 520 to merge with the middle of the first regeneration duct 38.

The air passing through the portion indicated by (m) in FIG. 12 is air that has been dried as a result of passing through the water adsorption position X of the first rotor 10 and whose carbon dioxide concentration has thereafter been reduced as a result of passing through the carbon dioxide adsorption position A of the second rotor 520 and whose carbon dioxide concentration has increased slightly as a result of passing through the cooling regeneration position C of the second rotor 520.

<5-2> Characteristics of Fifth Embodiment

In the carbon dioxide concentration reducing apparatus 501 of the fifth embodiment, the air supplied to the thermal regeneration position B of the second rotor 520 is air that has been dried as a result of passing through the water adsorption position X of the first rotor 10 and whose carbon dioxide concentration has thereafter been reduced as a result of passing through the carbon dioxide adsorption position A of the second rotor 520 and which has been heated by the heater 8. For this reason, air whose carbon dioxide concentration is low can be caused to pass through the thermal regeneration position B, so the carbon dioxide desorption efficiency can be further improved compared to a case where dried heated air is simply caused to pass through.

Further, in the carbon dioxide concentration reducing apparatus 501 of the fifth embodiment, the air supplied to the cooling regeneration position C of the second rotor 520 is air that has been dried as a result of passing through the water adsorption position X of the first rotor 10 and whose carbon dioxide concentration has thereafter been reduced as a result of passing through the carbon dioxide adsorption position A of the second rotor 520. For this reason, air whose carbon dioxide concentration is low can be caused to pass through the cooling regeneration position C, so the quantity of carbon dioxide adsorbed on the second rotor 520 when cooling the second rotor 520 can be reduced compared to a case where dried air is simply caused to pass through. Because of this, the portion about to head to the carbon dioxide adsorption position A of the second rotor 520 is sufficiently cooled and the quantity of carbon dioxide adsorbed thereon is kept low even in the cooling step, so its ability to adsorb carbon dioxide can be further improved.

<5-3> Modifications of Fifth Embodiment (A)

In the fifth embodiment, as shown in FIG. 12, the carbon dioxide concentration reducing apparatus 501 in which the before-cooling duct 536 and the second regeneration duct 537 that branch from the middle of the target space air supply duct 33 are disposed was taken as an example and described.

Figure 13:
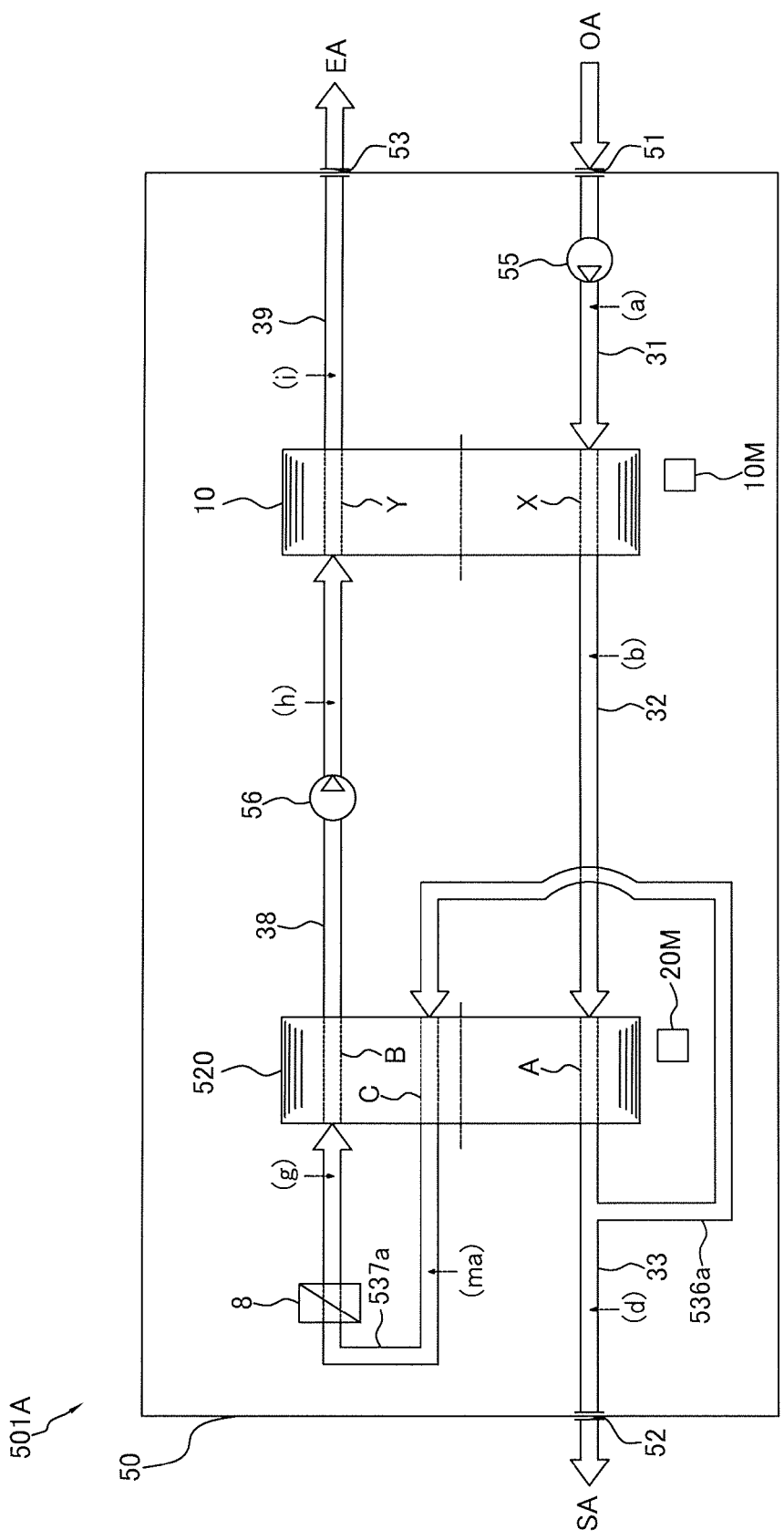
FIG. 13 is a schematic configuration diagram of a carbon dioxide concentration reducing apparatus pertaining to modification (A) of the fifth embodiment.

However, the present invention is not limited to the carbon dioxide concentration reducing apparatus 501; for example, as shown in FIG. 13, the present invention may also be applied to a carbon dioxide concentration reducing apparatus 501A in which a before-cooling duct 536a is employed instead of the before-cooling duct 536 and in which a second regeneration duct 537a is employed instead of the second regeneration duct 537. The before-cooling duct 536a causes the part of the air passing through the target space air supply duct 33 to branch and leads this air to the same face of the cooling regeneration position C of the second rotor 520 as the face on the side on which the air that has passed through the second air supply duct 32 flows into the second rotor 520 (leads this air to the right side of the second rotor 520 in FIG. 13). The second regeneration duct 537a leads, via the heater 8 to the thermal regeneration position B of the second rotor 520, the air that has passed through the same face of the cooling regeneration position C of the second rotor 520 as the face on the side on which the air flows out from the carbon dioxide adsorption position A of the second rotor 520 toward the target space air supply duct 33 (the air that has passed through the face on the left side of the second rotor 520 in FIG. 13).

The air passing through the portion indicated by (ma) in the second regeneration duct 537a is air that has been dried as a result of passing through the water adsorption position X of the first rotor 10 and whose carbon dioxide concentration has thereafter been reduced as a result of passing through the carbon dioxide adsorption position A of the second rotor 520 and which has thereafter been slightly warmed as a result of passing through the cooling regeneration position C of the second rotor 520 (and/or air whose carbon dioxide concentration has been slightly reduced).

In this carbon dioxide concentration reducing apparatus 501A, the number of branches from the target space air supply duct 33 is kept small compared to the carbon dioxide concentration reducing apparatus 501 shown in FIG. 12, so air whose carbon dioxide concentration is low and which eventually serves as the supply air SA can be efficiently obtained. Further, even in a case where air whose carbon dioxide concentration has increased slightly as a result of passing through the cooling regeneration position C of the second rotor 520 is used for thermal regeneration, the carbon dioxide desorption efficiency in the thermal regeneration position B can be sufficiently and easily ensured by sufficiently performing the heating by the heater 8.

(B)

In the fifth embodiment, as shown in FIG. 12, the carbon dioxide concentration reducing apparatus 501 in which the before-cooling duct 536 and the second regeneration duct 537 that branch from the middle of the target space air supply duct 33 are disposed was taken as an example and described.

Figure 14:
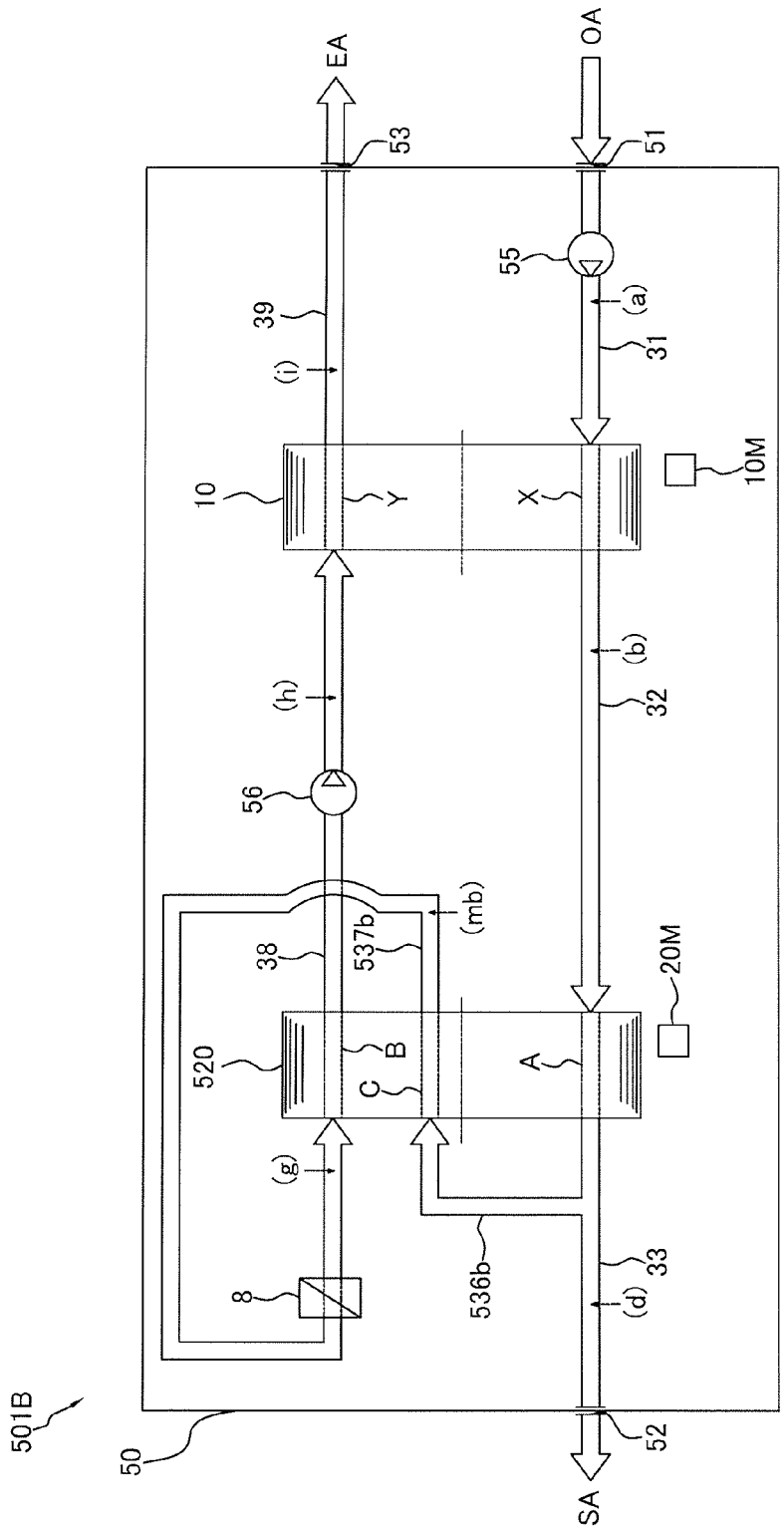
FIG. 14 is a schematic configuration diagram of a carbon dioxide concentration reducing apparatus pertaining to modification (B) of the fifth embodiment.

However, the present invention is not limited to the carbon dioxide concentration reducing apparatus 501; for example, as shown in FIG. 14, the present invention may also be applied to a carbon dioxide concentration reducing apparatus 501B in which a before-cooling duct 536b is employed instead of the before-cooling duct 536 and in which a second regeneration duct 537b is employed instead of the second regeneration duct 537. The before-cooling duct 536b causes the part of the air passing through the target space air supply duct 33 to branch and leads this air to the same face of the cooling regeneration position C of the second rotor 520 as the face on the side on which the air flows out from the second rotor 520 toward the target space air supply duct 33 (leads this air to the face on the left side of the second rotor 520 in FIG. 14). The second regeneration duct 537b leads, via the heater 8 to the thermal regeneration position B of the second rotor 520, the air that has passed through the same face of the cooling regeneration position C of the second rotor 520 as the face on the side on which the air that has passed through the second air supply duct 32 flows into the second rotor 520 (the air that has passed through the face on the right side of the second rotor 520 in FIG. 14).

The air passing through the portion indicated by (mb) in the second regeneration duct 537b is air that has been dried as a result of passing through the water adsorption position X of the first rotor 10 and whose carbon dioxide concentration has thereafter been reduced as a result of passing through the carbon dioxide adsorption position A of the second rotor 520 and which has thereafter been slightly warmed as a result of passing through the cooling regeneration position C of the second rotor 520 (and/or air whose carbon dioxide concentration has been slightly reduced).

In this carbon dioxide concentration reducing apparatus 501B, the number of branches from the target space air supply duct 33 is kept small compared to the carbon dioxide concentration reducing apparatus 501 shown in FIG. 12, so air whose carbon dioxide concentration is low and which eventually serves as the supply air SA can be efficiently obtained. Further, even in a case where air whose carbon dioxide concentration has increased slightly as a result of passing through the cooling regeneration position C of the second rotor 520 is used for thermal regeneration, the carbon dioxide desorption efficiency in the thermal regeneration position B can be sufficiently and easily ensured by sufficiently performing the heating by the heater 8.

<6> Sixth Embodiment

<6-1> Schematic Configuration of Carbon Dioxide Concentration Reducing Apparatus 601

Figure 15:
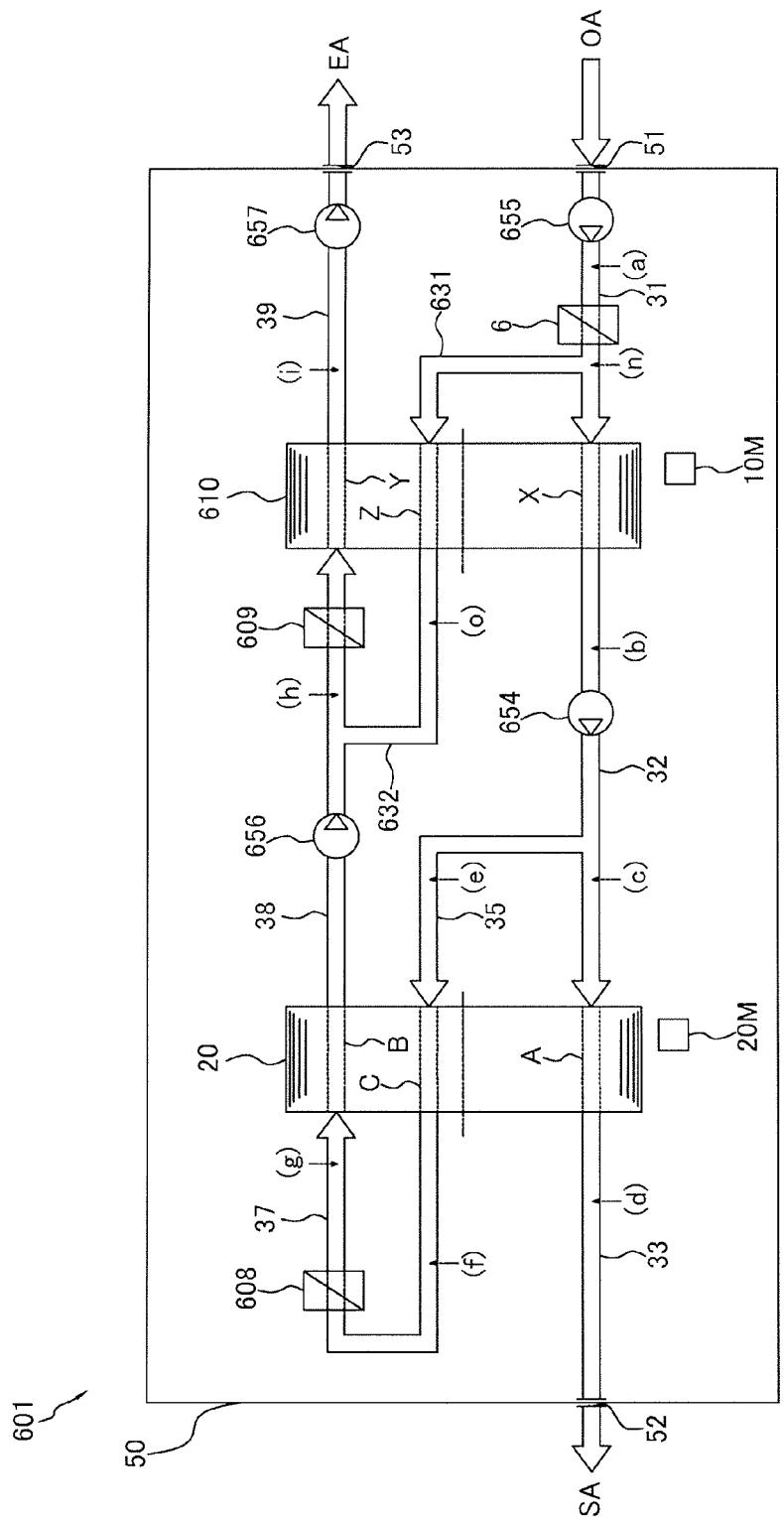
FIG. 15 is a schematic configuration diagram of a carbon dioxide concentration reducing apparatus pertaining to a sixth embodiment.

FIG. 15 shows a schematic configuration diagram of a carbon dioxide concentration reducing apparatus 601 pertaining to a sixth embodiment of the present invention. In FIG. 15, portions indicated by the same reference signs as the reference signs described in the first embodiment are generally the same, and description thereof will be omitted.

The carbon dioxide concentration reducing apparatus 601 is equipped with a first rotor 610 further having a cooling regeneration position Z instead of the first rotor 10, is equipped with a first air supply fan 655 and a second air supply fan 654 instead of the air supply fan 55, is equipped with a second air exhaust fan 656 and a first air exhaust fan 657 instead of the air exhaust fan 56, is equipped with a second heater 608 and a first heater 609 instead of the heater 8, and is equipped with a first before-cooling duct 631, a first after-cooling duct 632, and a precooler 6.

The first before-cooling duct 631 configures a flow path that leads the air that has branched from the middle of the first air supply duct 31 to the cooling regeneration position Z of the first rotor 610. The first after-cooling duct 632 configures a flow path that causes the air that has passed through the cooling regeneration position Z of the first rotor 610 to merge with the middle of the first regeneration duct 38. The precooler 6 is placed in the middle of the first air supply duct 31 on the upstream side of the portion from which the first before-cooling duct 631 branches, and the precooler 6 cools the air passing through it. This precooler 6 configures part of an unillustrated chilled water loop and can cool the air passing through the first air supply duct 31 because chilled water of about 7° C. flows in the chilled water loop.

Figure 16:
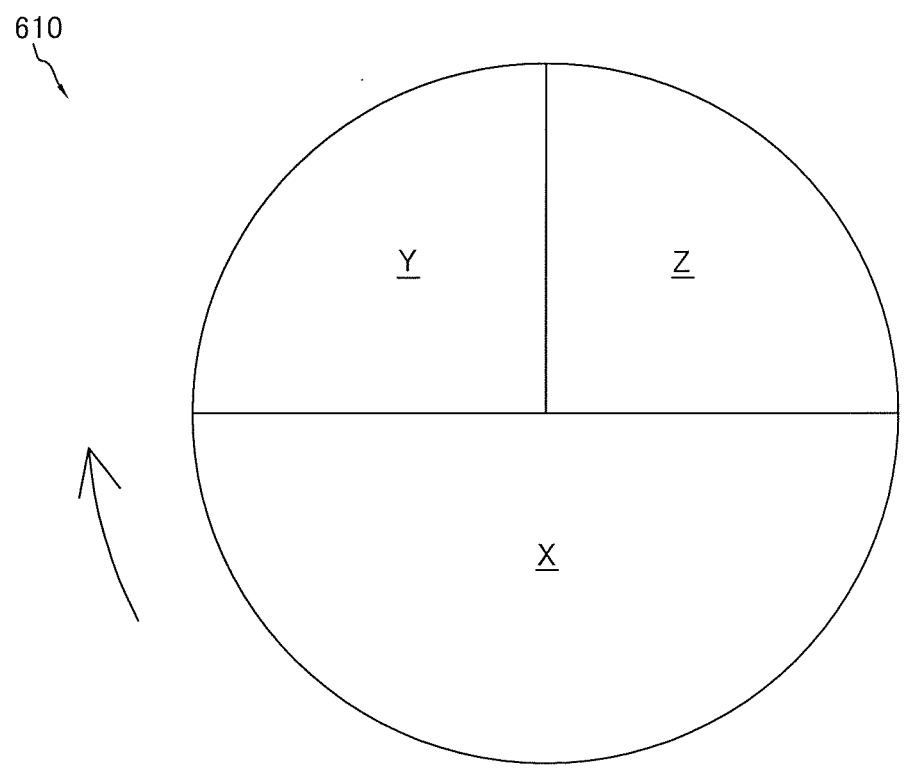
FIG. 16 is a schematic explanatory diagram of a first rotor of the sixth embodiment.

As shown in FIG. 16, which is a schematic configuration diagram of the first rotor 610 as seen from the outdoor air intake opening 51 and exhaust air opening 53 side, the lower half (corresponding to 180°) of the first rotor 610 is a water adsorption position X, the upper left half (corresponding to 90°) of the first rotor 610 is a thermal regeneration position Y, and the remaining upper right half (corresponding to 90°) of the first rotor 610 is the cooling regeneration position Z.

The first air supply fan 655 is placed in the first air supply duct 31 on the upstream side of the precooler 6. The second air supply fan 654 is placed in the second air supply duct 32 on the upstream side of the portion from which the cooling duct 35 branches. The second air exhaust fan 656 is placed in the first regeneration duct 38 on the upstream side of the portion with which the first after-cooling duct 632 merges. The first air exhaust fan 657 is placed in the air exhaust duct 39. The second heater 608 is placed in the middle of the second regeneration duct 37. This second heater 608 configures part of an unillustrated hot water loop and can heat the air passing through the second regeneration duct 37 because a fluid of about 200° C. flows in the hot water loop. The first heater 609 is placed in the first regeneration duct 38 on the downstream side of the portion with which the first after-cooling duct 632 merges. This first heater 609 configures part of an unillustrated hot water loop and can heat the air passing through the first regeneration duct 38 because a fluid of about 150° C. flows in the hot water loop. The temperatures of the fluids passing through the precooler 6, the first heater 609, and the second heater 608 can be regulated respectively. Regeneration of the first rotor 610 can also be performed by further heating in the first heater 609 the air that has been caused to pass through the thermal regeneration position B of the second rotor 20 and thereafter causing this air to pass through the thermal regeneration position Y of the first rotor 610. Because of this, space saving of the apparatus can be achieved because it is not necessary to newly introduce outdoor air for performing regeneration of the first rotor 610, and energy saving can also be achieved because it suffices to additionally heat the air that has been warmed to a certain extent.

The air passing through the portion indicated by (n) in FIG. 15 is air that has been cooled and dehumidified by the precooler 6. Specifically, water that the passing air includes becomes drain water and adheres to an unillustrated wall surface or the like of the precooler 6 when it passes through the precooler 6. Because of this, the air that has passed through the precooler 6 is dehumidified as a result of its water content being reduced by the amount adhering as drain water. The air passing through the portion indicated by (o) in FIG. 15 is cooled and dehumidified by the precooler 6, is thereafter warmed as a result of cooling the cooling regeneration position Z of the first rotor 610, and its temperature rises slightly. Like the step of cooling and regenerating the second rotor 20, the step of cooling and regenerating the first rotor 610 here involves cooling the first rotor 610 in order to improve its ability to adsorb water.

The first rotor 610 is one in which corrugated paper is formed into a honeycomb structure and silica gel is fixed thereto, and the first rotor 610 is obtained by the following method. First, paper (thickness of 0.2 mm, weight of 90 g/m$^2$) comprising alkali-resistant glass fiber including zirconia at 17% by weight and talc serving as a filler is taken as a material and silica sol is used as an adhesive to obtain corrugated paper. This corrugated paper is obtained using a method that is usually performed in the manufacture of corrugated cardboard. Next, while rolling up this corrugated paper, the same silica sol is used as an adhesive to obtain a spiral cylindrical body in which the height of the mountains of the waveform portions is about 1.9 mm. This cylindrical body is immersed for 30 minutes in a no. 1 sodium silicate solution having a solid component concentration of 28%, the liquid is drained, thereafter the cylindrical body is immersed for 30 minutes in an aqueous solution of calcium having a concentration of 10% and a temperature of 50° C., and then the cylindrical body is immersed for 30 minutes at room temperature in hydrochloric acid having a concentration of 5%. Thereafter, the cylindrical body is rinsed with water, heated at 100° C., and fired at 400° C. to remove organic matter. The steps from immersion in the sodium silicate solution to firing at 400° C. are repeated two more times, whereby the first rotor 610 is obtained. In addition to the above, a rotor obtained by the publicly known method described in JP-A No. 63-218235, for example, may also be used for this first rotor 610.

The second rotor 20 is one in which corrugated paper is formed into a honeycomb structure and a zeolite is fixed thereto, and Molecular Sieve 13× manufactured by Union Showa K.K. is used for the second rotor 20.

Regarding the axial direction thicknesses of the first rotor 610 and the second rotor 20, when the thicknesses are set thicker than necessary, the adsorption quantity increases but it is easy for regeneration to become insufficient. Further, likewise also regarding the detailed configuration of the silica gel and the detailed configuration of the zeolite, in a case where the adsorption quantity has increased, it is easy for regeneration to become insufficient. In light of these points, regarding the detailed configurations of the first rotor 610 and the second rotor 20, rotors that have been configured so as to follow each purpose are used. Specifically, the axial direction thickness of the first rotor 610 is 400 mm. The diameter of the first rotor 610 is 1500 mm. The angular velocity (number of rotations) of the first rotor 610 is regulated so as to become 4 rotations per hour by adjusting the extent of the driving of the first motor 10M. Further, the axial direction thickness of the second rotor 20 is 400 mm. The diameter of the second rotor 20 is 1500 mm. The angular velocity (number of rotations) of the second rotor 20 is regulated so as to become 10 rotations per hour by adjusting the extent of the driving of the second motor 20M.

<6-2> Example Overview of Operation of Carbon Dioxide Concentration Reducing Apparatus 601

A process in which the carbon dioxide concentration reducing apparatus 601 described above is used to obtain air whose carbon dioxide concentration falls below 30 ppm will be described.

The outdoor air OA, which corresponds to air-to-be-treated, had a temperature of 20° C. and a carbon dioxide concentration of 390 ppm.
(Air Volume Setting)

By regulating each of the fans 654, 655, 656, and 657 of the carbon dioxide concentration reducing apparatus 601, the air flows inside the apparatus became as indicated below.

The air volume of the air flowing into the water adsorption position X of the first rotor 610 was 3.0 m$^3$/min, and the air speed thereof was 2.0 m/sec. The air volume of the air after having passed through the heater 609 and flowing into the thermal regeneration position Y of the first rotor 610 was 1.5 m$^3$/min, and the air speed thereof was 2.0 m/sec. The air volume of the air passing through the first before-cooling duct 631 and flowing into the cooling regeneration position Z of the first rotor 610 was 1.5 m$^3$/min, and the air speed thereof was 2.0 m/sec. The air volume of the air flowing into the carbon dioxide adsorption position A of the second rotor 20 was 2 m$^3$/min, and the air speed thereof was 1.0 m/sec. The air volume of the air flowing into the thermal regeneration position B of the second rotor 20 was 1.0 m$^3$/min, and the air speed thereof was 1.0 m/sec. The air volume of the air flowing into the cooling regeneration position C of the second rotor 20 was 1.0 m$^3$/min, and the air speed thereof was 1.0 m/sec.
(Air Quality in Each Portion)

The air passing through the portion indicated by (n) in FIG. 15 after having passed through the precooler 6 had a temperature of 5° C. and an absolute humidity of 3 g/kg'. The same was also true of the air passing through the first before-cooling duct 631.

The air passing through the portion indicated by (b) in FIG. 15 after having passed through the water adsorption position X of the first rotor 610 had an absolute humidity of 0.029 g/kg' (a dew point of –50° C.).

The concentration of carbon dioxide in the air before passing through the first rotor 610 and the concentration of carbon dioxide in the air after having passed through the first rotor 610 were both 390 ppm and showed no change.

The air flowing into the carbon dioxide adsorption position A of the second rotor 20 indicated by (c) in FIG. 15 had a temperature of 27° C., an absolute humidity of 0.029 g/kg' (a dew point of –50° C.), and a carbon dioxide concentration of 390 ppm.

The air on the outlet side of the carbon dioxide adsorption position A of the second rotor 20 indicated by (d) in FIG. 15 had a carbon dioxide concentration of 10 to 20 ppm.

The air heading toward the thermal regeneration position B of the second rotor 20 after having passed through the second heater 608 indicated by (g) in FIG. 15 had an absolute humidity of 0.029 g/kg' (a dew point of –50° C.) and a temperature of 190° C.

The air about to flow into the cooling regeneration position C of the second rotor 20 indicated by (e) in FIG. 15 had an absolute humidity of 0.029 g/kg' (a dew point of –50° C.) and a temperature of 27° C.

The air after having passed through the first heater 609 and flowing into the thermal regeneration position Y of the first rotor 610 had an absolute humidity of 10 g/kg and a temperature of 130° C.

In this way, the air that has passed through the first rotor 610 has a dew point of about –50° C., which is –30° C. or lower. Because of this, the dew points of the air in the portions indicated by (b), (c), (e), and (g) in FIG. 15 can all be made –30° C. or lower.

Further, the air after having passed through the cooling regeneration position C of the second rotor 20 is led to the thermal regeneration position B of the second rotor 20 without taking in water from outside. For this reason, the air flows passing through the carbon dioxide adsorption position A, the thermal regeneration position B, and the cooling regeneration position C of the second rotor 20 are all air flows whose dew point has been lowered to –30° C. or lower, and the second rotor 20 can be suppressed from ending up adsorbing water in preference to carbon dioxide.

When the air that has been dried such that its dew point becomes about –50° C. in this way passes through the carbon dioxide adsorption position A of the second rotor 20, carbon dioxide is efficiently adsorbed, whereby the concentration of the carbon dioxide can be lowered to 10 to 20 ppm, and air whose carbon dioxide concentration is 30 ppm or lower can be obtained. It is preferable to regulate the concentration of carbon dioxide in the obtained air such that it becomes 20 ppm or lower, and more preferably 10 ppm or lower, by regulating the operations conditions and so forth.

<6-3> Characteristics of Sixth Embodiment

In the carbon dioxide concentration reducing apparatus 601 of the sixth embodiment, also in regard to the first rotor 610, not only can thermal regeneration be performed but also cooling regeneration can be actively performed using the air that has been cooled and dehumidified by the precooler 6. For this reason, the ability to adsorb water in the water adsorption position X of the first rotor 10 can be improved. Because of this, the air sent to the carbon dioxide adsorption position A of the second rotor 20 becomes drier, so the second rotor 20 can be suppressed from being used for water adsorption, and the adsorption power of the second rotor 20 can be concentrated on carbon dioxide adsorption.

Moreover, also in regard to the air passing through the cooling duct 35 after having passed through the water adsorption position X of the first rotor 610, the effect of cooling by the precooler 6 continues. For this reason, also in regard to the step of cooling the second rotor 20, not only can heat radiation resulting from simply causing room-temperature air to pass through be accelerated, but the temperature can be efficiently lowered by the air that has been actively cooled. For this reason, the ability to adsorb carbon dioxide in the carbon dioxide adsorption position A of the second rotor 20 can be even further improved.

Because of the above, air whose carbon dioxide concentration is 30 ppm or lower can be supplied to the target space.

<7> Other Embodiments (A)

In the first embodiment to the sixth embodiment, supplying air whose carbon dioxide concentration is low to a target space was described. Examples of target spaces in which it is desired that the carbon dioxide concentration be low include environments in which are handled substances whose reaction with carbon dioxide is to be suppressed, such as sites where lithium-ion batteries are manufactured.

(B)

In each of the embodiments and their modifications, a case where water and carbon dioxide are removed from the air-to-be-treated was taken as an example and described.

However, the present invention is not limited to this; for example, in place of carbon dioxide, one of either NOx (nitrogen oxides) or SOx (sulfur oxides) or both NOx and SOx may also be taken as removal target. In this case also, it is preferable to remove water from the air-to-be-treated before performing removal of NOx or the like.

(C)

In each of the embodiments and their modifications, the carbon dioxide concentration reducing apparatus 1 etc. in which two rotors—such as the first rotor 10 and the second rotor 20 etc.—are disposed were taken as examples and described.

However, the present invention is not limited to this; for example, three or more rotors may also be disposed in series along the flow of the air-to-be-treated. In this case, it becomes easier to reduce the carbon dioxide concentration.

(D)

In each of the embodiments and their modifications, the one carbon dioxide concentration reducing apparatus 1 in which the first rotor 10 etc. that mainly reduce the water concentration and the second rotor 20 etc. that mainly reduce the carbon dioxide concentration are placed in series with respect to the flow of the air-to-be-treated was taken as an example and described.

However, the present invention is not limited to this; for example, a plurality of the carbon dioxide concentration reducing apparatus described above may also be placed with respect to the flow of the air-to-be-treated to configure a carbon dioxide concentration reducing system in which the carbon dioxide concentration reducing apparatus that have been juxtaposed are appropriately made to reciprocally interact by choosing the required quality of air.

(E)

In each of the embodiments and their modifications, a case where the pressure of the fluid when the fluid is caused to pass through the first rotor 10 etc. and the second rotor 20 etc. is not limited whatsoever has been taken as an example and described.

With respect thereto, the fluid that is caused to pass through the first rotor 10 etc. and the second rotor 20 etc. may also be a fluid that is not pressurized whatsoever. Further, even if the fluid is pressurized, the pressure may be to the extent of applying a force for carrying the fluid (the application of a propulsive force by the air supply fan 55) so as to cause the fluid to pass through the first rotor 10 etc. and the second rotor 20 etc. In these cases, separate pressurizing means become unnecessary, so the consumed energy required for the driving of the pressurizing means can be curtailed, and it also becomes possible to reduce running costs.

(F)

Fluid treatment methods and apparatus obtained by appropriately combining, to an extent realizable by persons skilled in the art without entailing excessive trial and error, the matters described in each of the embodiments and their modifications are naturally also included in the present invention.

INDUSTRIAL APPLICABILITY

The fluid treatment method and apparatus of the present invention can improve the effect of recovering an adsorbent and are particularly useful in cases of obtaining air whose carbon dioxide concentration is low.

What is claimed is:

1. A fluid treatment method of reducing a concentration of carbon dioxide included in a fluid-to-be-treated, the method comprising:
  a first step of reducing a concentration of water in the fluid-to-be-treated in order to obtain a first fluid by a water treatment unit including silica-gel;
  a second step of causing part of the first fluid to pass through a carbon dioxide adsorption position, which is part of an adsorption unit, in order to obtain a second fluid, the adsorption unit
    including zeolite,
    being different from the water treatment unit,
    being capable of adsorbing both carbon dioxide and water, and
    having at least an ability to adsorb carbon dioxide that is temperature dependent; and
  a regeneration step of causing a third fluid to pass through a portion of the adsorption unit through which the first fluid has been caused to pass, the third fluid obtained by heating a fluid being the first fluid that has passed through part of the adsorption unit other than the carbon dioxide adsorption position or obtained by heating another part of the first fluid
    having a concentration of water that is lower than in the fluid-to-be-treated and
    having a temperature that is higher than the fluid-to-be-treated.

2. The fluid treatment method according to claim 1, wherein
  the concentration of carbon dioxide in the third fluid is also reduced.

3. The fluid treatment method according to claim 1, further comprising
  a cooling step of causing a cooling fluid to pass through the portion of the adsorption unit through which the third fluid has passed in the regeneration step, the cooling fluid
    being part of the first fluid or the second fluid and
    having a temperature lower than the third fluid.

4. The fluid treatment method according to claim 3, wherein
  the third fluid is a fluid obtained by heating the cooling fluid that has passed through the adsorption unit in the cooling step.

5. The fluid treatment method according to claim 1, wherein
  the regeneration step is performed by moving a position through which the first fluid is caused to pass and a position through which the third fluid is caused to pass in the adsorption unit.

6. The fluid treatment method according to claim 1, wherein
  the concentration of water in the third fluid is lower than the concentration of water in the fluid-to-be-treated, the temperature of the third fluid is higher than that of the fluid-to-be-treated and, the dew point of the third fluid is equal to or less than $-30°$ C.

7. The fluid treatment method according to claim 1, wherein the concentration of carbon dioxide in the third fluid is lower than the concentration of carbon dioxide in the fluid-to-be-treated.

8. A fluid treatment apparatus configured to reduce a concentration of carbon dioxide included in a fluid-to-be-treated, the fluid treatment apparatus comprising:

water treatment unit including silica-gel and configured to reduce a concentration of water included in the fluid-to-be-treated;

an adsorption unit including zeolite and different from the water treatment unit, the adsorption unit being configured to adsorb both carbon dioxide and the water and having at least an ability to adsorb carbon dioxide that is temperature dependent;

a first feed unit configured to cause part of a first fluid to pass through a carbon dioxide adsorption position, which is part of the adsorption unit, the first fluid being the fluid-to-be-treated that has passed through the water treatment unit;

a heating unit configured to heat a fourth fluid until a temperature of the fourth fluid becomes higher than the fluid-to-be-treated to thereby obtain a fifth fluid, the fourth fluid being the first fluid that has passed through part of the adsorption unit other than the carbon dioxide adsorption position or being another part of the first fluid; and a second feed unit configured to cause the fifth fluid to pass through a portion of the adsorption unit through which the part of the first fluid has passed via the first feed unit.

9. The fluid treatment apparatus according to claim 8, further comprising a third feed unit configured to cause to pass through the portion of the adsorption unit through which the fifth fluid has passed, the first cooling fluid being part of the fluid-to-be-treated that has been treated in the water treatment unit or part of the fluid-to-be-treated that has passed through at least part of the adsorption unit after having been treated in the water treatment unit and that has a temperature lower than the fifth fluid.

10. The fluid treatment apparatus according to claim 9, wherein the fifth fluid is a fluid obtained by heating the first cooling fluid that has passed through the adsorption unit.

11. The fluid treatment apparatus according to claim 8, wherein the concentration of carbon dioxide in the fifth fluid is reduced by the adsorption unit.

12. The fluid treatment apparatus according to claim 8, further comprising a drive unit configured to move a position through which the first fluid is caused to pass and a position through which the fifth fluid is caused to pass in the adsorption unit.

13. The fluid treatment apparatus according to claim 8, wherein the concentration of water in the fifth fluid is lower than the concentration of water in the fluid-to-be-treated, the temperature of the fifth fluid is higher than that of the fluid-to-be-treated and, the dew point of the fifth fluid is equal to or less than $-30°$ C.

14. The fluid treatment apparatus according to claim 8, wherein the concentration of carbon dioxide in the fifth fluid is lower than the concentration of carbon dioxide in the fluid-to-be-treated.

15. A fluid treatment apparatus configured to reduce a concentration of a first component included in a fluid-to-be-treated, the fluid treatment apparatus comprising:

a second component first treatment unit configured to reduce a concentration of a second component differing from the first component and included in the fluid-to-be-treated;

an adsorption unit configured to adsorb both the first component and the second component and having at least an ability to adsorb the first component that is temperature dependent;

a fourth feed unit configured to cause a first fluid to pass through at least part of the adsorption unit, the first fluid being the fluid-to-be-treated that has passed through the second component first treatment unit;

a second component second treatment unit configured to reduce the concentration of the second component;

a heating unit configured to heat until a temperature of the sixth fluid becomes higher than the fluid-to-be-treated in order to obtain a fifth fluid, the sixth fluid being at least is obtained by a treatment using the second component second treatment unit and having a concentration of the second component that is lower than in the fluid-to-be-treated; and a fifth feed unit configured to cause the fifth fluid to pass through a portion of the adsorption unit through which the fluid-to-be-treated has passed via the second component first treatment unit.

16. The fluid treatment apparatus according to claim 15, further comprising a sixth feed unit configured to cause a second cooling fluid to pass through the portion of the adsorption unit through which the fifth fluid has passed, the second cooling fluid being part of the fluid-to-be-treated that has been treated in the second component second treatment unit.

17. The fluid treatment apparatus according to claim 16, wherein the fifth fluid is a fluid obtained by heating the second cooling fluid that has passed through the adsorption unit.

* * * * *